(12) United States Patent
Nozaki et al.

(10) Patent No.: US 8,123,363 B2
(45) Date of Patent: Feb. 28, 2012

(54) PROJECTOR DEVICE, PORTABLE TELEPHONE AND CAMERA

(75) Inventors: Hirotake Nozaki, Port Washington, NY (US); Tadashi Ohta, Midori-ku (JP); Setsu Mitsuhashi, Setagaya-ku (JP); Keiichi Nitta, Kawasaki (JP); Akira Ohmura, Shibuya-ku (JP); Nobuhiro Fujinawa, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/958,289

(22) Filed: Dec. 1, 2010

(65) Prior Publication Data

US 2011/0075102 A1   Mar. 31, 2011

Related U.S. Application Data

(62) Division of application No. 11/660,498, filed as application No. PCT/JP2005/016742 on Sep. 12, 2005.

(30) Foreign Application Priority Data

Sep. 21, 2004 (JP) ................. 2004-273417
Sep. 21, 2004 (JP) ................. 2004-273427
Sep. 21, 2004 (JP) ................. 2004-273428
Sep. 21, 2004 (JP) ................. 2004-273429
Sep. 21, 2004 (JP) ................. 2004-273433
Sep. 21, 2004 (JP) ................. 2004-273435

(51) Int. Cl.
*G03B 21/14* (2006.01)
*G03B 21/00* (2006.01)
*G03B 17/48* (2006.01)
*H04N 3/22* (2006.01)
*H04N 7/18* (2006.01)
*H04N 17/00* (2006.01)
*H04N 5/225* (2006.01)

(52) U.S. Cl. ............ 353/69; 353/122; 353/70; 348/745; 348/64; 348/175; 348/207.99; 348/208.12; 396/430; 396/431

(58) Field of Classification Search ................. 353/122, 353/69, 70; 348/745, 64, 175, 207.99, 208.12, 348/746; 396/430, 431
See application file for complete search history.

(56) References Cited

U.S. PATENT DOCUMENTS

| | | | |
|---|---|---|---|
| 5,231,481 A | 7/1993 | Eouzan et al. | |
| 5,532,764 A | 7/1996 | Itaki | |
| 5,838,396 A | 11/1998 | Shiota et al. | |
| 6,018,361 A | 1/2000 | Fujii et al. | |
| 6,715,888 B1* | 4/2004 | Raskar et al. | 353/94 |
| 6,717,625 B1 | 4/2004 | Thielemans | |
| 6,753,907 B1 | 6/2004 | Sukthankar et al. | |
| 2002/0024640 A1 | 2/2002 | Ioka | |
| 2002/0186221 A1 | 12/2002 | Bell | |
| 2003/0071966 A1 | 4/2003 | Matsumoto | |
| 2003/0164927 A1 | 9/2003 | Tsukada | |

FOREIGN PATENT DOCUMENTS

| | | |
|---|---|---|
| CN | 1411782 A | 4/2003 |
| EP | 0 616 473 A2 | 9/1994 |
| EP | 0 817 157 A2 | 1/1998 |
| EP | 0 915 624 A2 | 5/1999 |
| JP | 04-123030 A | 4/1992 |

(Continued)

*Primary Examiner* — Georgia Y Epps
*Assistant Examiner* — Magda Cruz
(74) *Attorney, Agent, or Firm* — Miles & Stockbridge P.C.

(57) ABSTRACT

A projector device that generates a projection image, photographs this projection image and performs various adjustments to the projection image.

9 Claims, 13 Drawing Sheets

FOREIGN PATENT DOCUMENTS

| | | | |
|---|---|---|---|
| JP | H06-070328 A | 3/1994 | |
| JP | 09-326981 A | 12/1997 | |
| JP | H10-115869 A | 5/1998 | |
| JP | 10-319506 A | 12/1998 | |
| JP | H10-319506 A | 12/1998 | |
| JP | 2000-150157 A | 5/2000 | |
| JP | 2000-194275 A | 7/2000 | |
| JP | 2000236375 A | * | 8/2000 |
| JP | 2000-284363 A | 10/2000 | |
| JP | 2001-024926 A | 1/2001 | |
| JP | 2002-072359 A | 3/2002 | |
| JP | 2002-261889 A | 9/2002 | |
| JP | 2002-262198 A | 9/2002 | |
| JP | 2002-328428 A | 11/2002 | |
| JP | 2003-015218 A | 1/2003 | |
| JP | 2003-066369 A | 3/2003 | |
| JP | 2003-233126 A | 8/2003 | |
| JP | 2003-283964 A | 10/2003 | |
| JP | 2003-315911 A | 11/2003 | |
| JP | 2003-323610 A | 11/2003 | |
| JP | 2003-348498 A | 12/2003 | |
| JP | 2004-012876 A | 1/2004 | |
| JP | 2004-015204 A | 1/2004 | |
| JP | 2004-033334 A | 2/2004 | |
| JP | 2004-109246 A | 4/2004 | |
| JP | 2004-198868 A | 7/2004 | |
| JP | 2005-094599 A | 4/2005 | |
| JP | 2005-236746 A | 9/2005 | |
| WO | WO 99/29116 A1 | 6/1999 | |

* cited by examiner

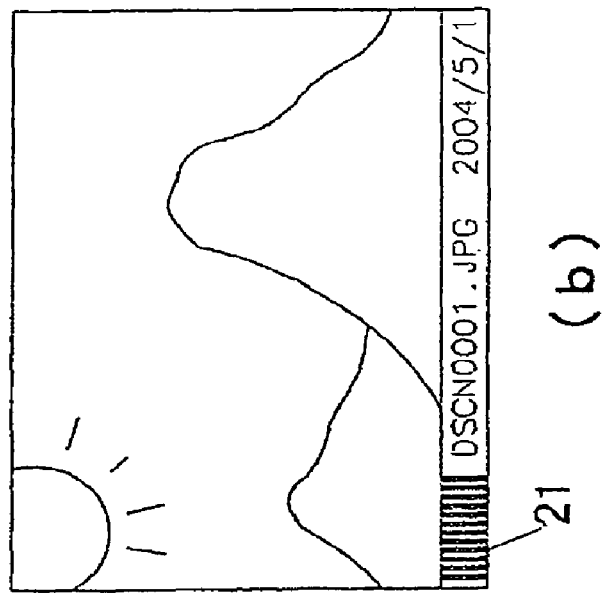
(b)
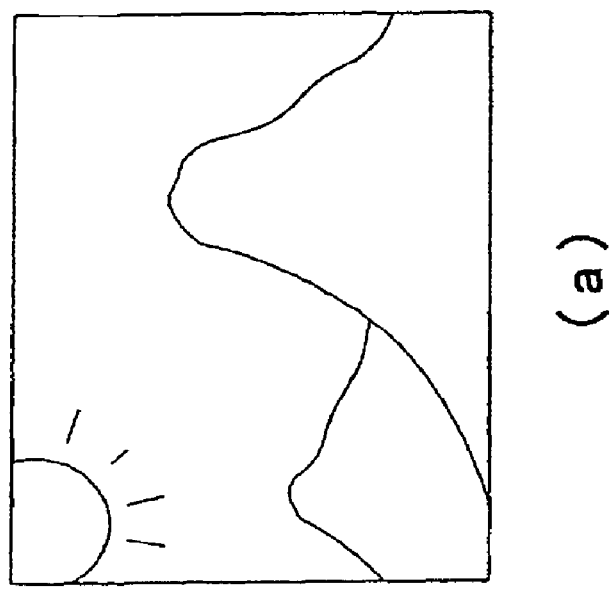
(a)
FIG.4

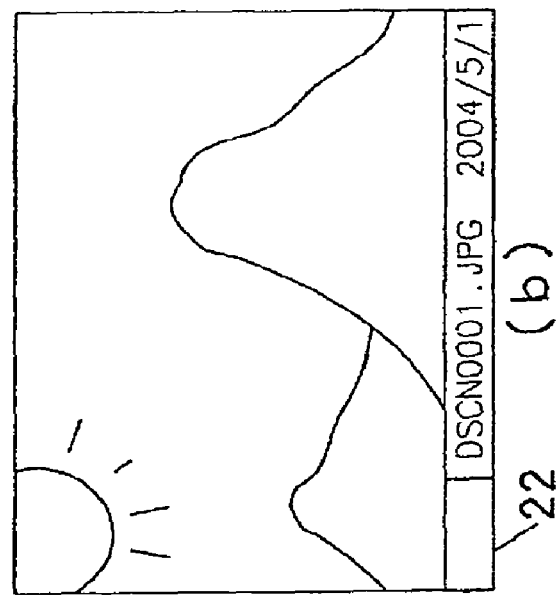
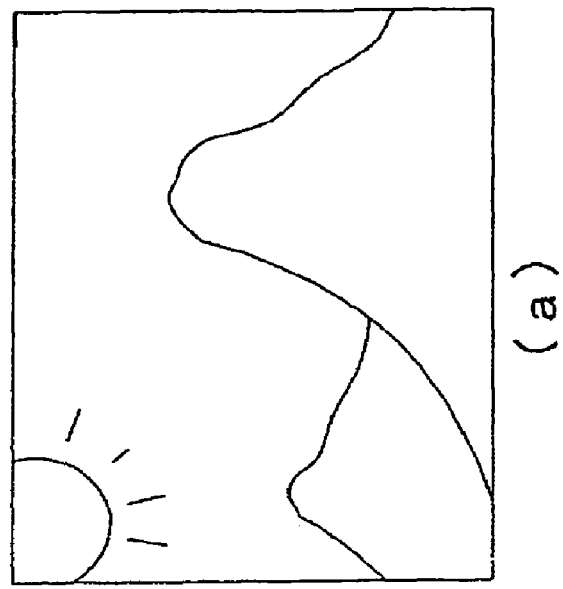
FIG.6

FIG.7
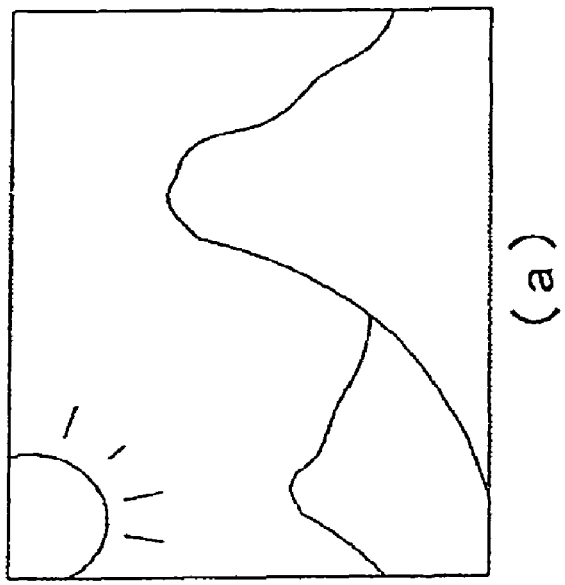
(a)
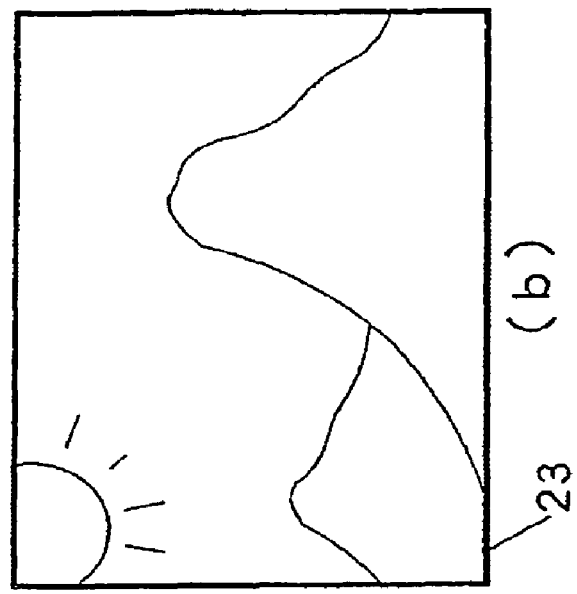
(b)

FIG.9
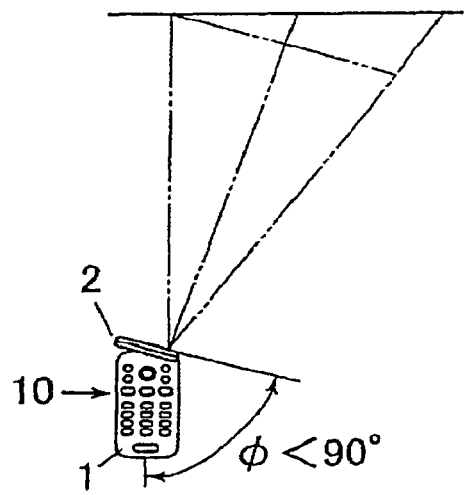
(a)
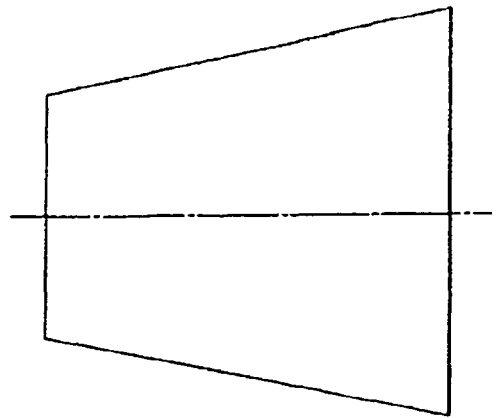
(b)
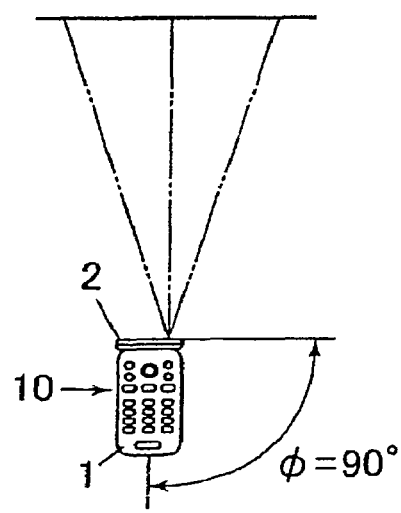
(c)
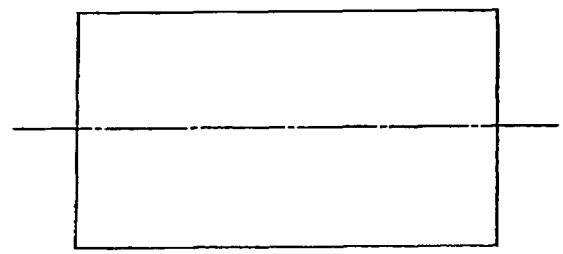
(d)

PROJECTOR DEVICE, PORTABLE TELEPHONE AND CAMERA

CROSS-REFERENCE TO RELATED APPLICATION

This application is a divisional of application Ser. No. 11/660,498 filed Oct. 17, 2007, which is a 371 of International Patent Application No. PCT/JP2005/016742 filed Sep. 12, 2005.

TECHNICAL FIELD

The present invention relates to a projector device which projects an image upon a projection surface and generates this projection image, such as a projection type liquid crystal projector which uses a liquid crystal display panel, and which is a handy type of projector device or the like housed in a portable telephone or a camera.

BACKGROUND ART

As a projection type liquid crystal projector, one which uses a halogen lamp or a xenon lamp or the like as a light source is known from the past. Such a projector separates the light outputted from the light source into red (R), green (G), and blue (B) primary colored lights, synthesizes them together again after having passed each of them through a different liquid crystal display panel, and projects the synthesized light via a projection lens upon a projection surface such as a screen or the like. However, with this kind of projection type liquid crystal projector which uses a lamp light source, there has been the shortcoming that the device has been large in size, since it is necessary to perform separation and synthesis in the optical system. Thus, in order to resolve this shortcoming, it is known to use as the light source, for example, R, G, and B laser light (Patent Document 1), or R, G, and B LED light (Patent Document 2) or the like.

Patent Document 1: Japanese Laid-Open Patent Publication No. H9-326981
Patent Document 2: Japanese Laid-Open Patent Publication No. 2000-194275

DISCLOSURE OF THE INVENTION

Problems to be Solved by the Invention

By making the device more compact by using a light source such as those disclosed in Patent Documents 1 and 2, it is possible to build a projection type liquid crystal projector of a handy type which can be used while being hand-held. However, since a handy type projection type liquid crystal projector is used by being held in the hand of the user, accordingly, as compared to projection type liquid crystal projectors of the prior art stand-mounted type, there are various different aspects to consider with regard to the method of use. Due to this, various kinds of operations have been necessary in order to implement a handy type projection type liquid crystal projector which can easily be employed from the point of view of the user, which have not been needed in the case of a prior art stand-mounted type projection type liquid crystal projector.

Means for Solving the Problems

The projector device according to the present invention generates a projection image, photographs this projection image and performs various adjustments to the projection image.

The projector device according to the present invention comprises a projection image generation device that projects an image upon a projection surface and generates a projection image of the image, a photographic device that photographs an object to be photographed and acquires a photographic image of the object, and a calibration control device that repeatedly executes calibration operation for adjusting an appearance of the projection image on the projection surface during projection of the projection image, based upon the photographic image of the projection image which is acquired by photography by the photographic device.

In the projector device described above, the calibration control device can repeatedly execute the calibration operation upon a fixed cycle. Or, the projector device can further comprise an actuation input device for receiving actuation input from a user, and the calibration control device can repeatedly execute the calibration operation each time actuation input is performed to the actuation input device.

In the projector device according to the present invention, the projection image generation device can project an image which includes a predetermined shape pattern, and the calibration control device can execute the calibration operation based upon the predetermined shape pattern which, is included in a photographic image of the projection image.

In the projector device described above, it is desirable that the projection image generation device projects the image including the predetermined shape pattern for a predetermined short time period, and that the photographic device photographs the projection image as an object to be photographed in synchronization with projection timing of the image.

In the projector device described above, the projector device may further comprise a setting device that sets a frequency for execution of the calibration operation, and when a first execution frequency is set by the setting device, the calibration control device may repeatedly execute the calibration operation during the projection of the projection image, when a second execution frequency is set, the calibration control device may execute the calibration operation only once during projection of the projection image, and when a third execution frequency is set, the calibration control device may not execute the calibration operation.

Or, the projector device according to the present invention comprises a projection image generation device that projects an image including a predetermined shape pattern upon a projection surface and generates a projection image of the image, a photographic device that photographs an object to be photographed and acquires a photographic image of the object, and a focusing device that adjusts a focus state of the projection image based upon the predetermined shape pattern included in the photographic image of the projection image which is acquired by photography by the photographic device.

Alternatively, the projector device according to the present invention comprises a projection image generation device that projects either one of a still image and a moving image upon a projection surface and generates a projection image of the still image or the moving image, a photographic device that photographs an object to be photographed and acquires a photographic image of the object, and a focusing device that, when the still image is projected by the projection image generation device, adjusts a focus state of the projection image based upon the photographic image of the projection image which is acquired by photography by the photographic device.

In the projector device described above, when projecting the moving image, the projection image generation device can include a predetermined shape pattern in the moving image during projection, and when the moving image in which the predetermined shape pattern is included is projected by the projection image generation device, the focusing device can adjust the focus state of the projection image based upon the predetermined shape pattern which is included in the photographic image of the projection image.

In the projector device described above, the focusing device may repeatedly perform the adjustment of the focus state of the projection image during the projection of the projection image. At this time, it is desirable that the adjustment of the focus state of the projection image is repeatedly performed upon a fixed cycle. Or, the projector device may further comprise an actuation input device for receiving actuation input from a user, and the focusing device may repeatedly perform the adjustment of the focus state of the projection image each time actuation input is performed to the actuation device.

In the projector device described above, it is preferable that the projection image generation device projects the image including the predetermined shape pattern for a predetermined short time period, and that the photographic device photographs the projection image as the object to be photographed in synchronization with projection timing of the image.

In the projector device described above, the projector device may further comprise a setting device that sets a frequency of adjustment of the focus state of the projection image, and when a first frequency of adjustment is set by the setting device, the focusing device may perform adjustment of the focus state of the projection image repeatedly during the projection of the projection image, when a second frequency of adjustment is set, the focusing device may perform adjustment of the focus state of the projection image only once during the projection of the projection image, and when a third frequency of adjustment is set, the focusing device may not perform adjustment of the focus state of the projection image.

Or, the projector device according to the present invention comprises a projection image generation device that projects an image including a predetermined shape pattern upon a projection surface and generates a projection image of the image, a photographic device that photographs an object to be photographed and acquires a photographic image of the object, and a brightness adjustment device that adjusts a brightness of the projection image based upon the predetermined shape pattern included in the photographic image of the projection image which is acquired by photography by the photographic device.

Alternatively, the projector device according to the present invention comprises a projection image generation device that comprises a light source, projects an image by using light emitted from the light source upon a projection surface and generates a projection image of the image, a photographic device that photographs an object to be photographed and acquires a photographic image of the object, and a brightness adjustment device that adjusts a brightness of the projection image based upon the photographic image of the projection image which is acquired by photography by the photographic device, by varying amount of light emission from the light source.

In the projector device described above, if the brightness of the projection image is darker than a predetermined reference value, the brightness adjustment device can adjust the brightness of the projection image by decreasing the amount of light emission from the light source, and if the brightness of the projection image is brighter than the reference value, the brightness adjustment device can adjust the brightness of the projection image by changing brightness of the image being projected.

In the projector device described above, the brightness adjustment device can repeatedly perform the adjustment of the brightness of the projection image during the projection of the projection image. At this time, it is desirable that the adjustment of the brightness of the projection image is repeatedly performed upon a fixed cycle. Or, the projector device may further comprise an actuation input device for receiving actuation input from a user, and the brightness adjustment device may repeatedly perform the adjustment of the brightness of the projection image each time actuation input is performed to the actuation device.

In the projector device described above, it is preferable that the projection image generation device projects the image including the predetermined shape pattern for a predetermined short time period, and that the photographic device photographs the projection image as the object to be photographed in synchronization with projection timing of the image.

In the projector device described above, the projector device may further comprise a setting device that sets a frequency of adjustment of the brightness of the projection image, and when a first frequency of adjustment is set by the setting device, the brightness adjustment device may perform adjustment of the brightness of the projection image repeatedly during the projection of the projection image, when a second frequency of adjustment is set, the brightness adjustment device may perform adjustment of the brightness of the projection image only once during the projection of the projection image, and when a third frequency of adjustment is set, the brightness adjustment device may not perform adjustment of the brightness of the projection image.

Or, the projector device according to the present invention comprises a projection image generation device that projects an image including a predetermined shape pattern upon a projection surface and generates a projection image of the image, a photographic device that photographs an object to be photographed and acquires a photographic image of the object, and a hue adjustment device that adjusts the hue of the projection image based upon the predetermined shape pattern included in the photographic image of the projection image which is acquired by photography by the photographic device.

Alternatively, the projector device according to the present invention comprises a projection image generation device that comprises a light source which emits light of a plurality of colors, projects an image by using light synthesized from the light of various colors emitted from the light source upon a projection surface and generates a projection image of the image, a photographic device that photographs an object to be photographed and acquires a photographic image of the object, and a hue adjustment device that adjusts a hue of the projection image based upon the photographic image of the projection image which is acquired by photography by the photographic device, by varying amount of light emission from the light source for each of its light emitting colors.

In the projector device described above, the hue adjustment device can repeatedly perform the adjustment of the hue of the projection image during the projection of the projection image. At this time, it is desirable that the adjustment of the hue of the projection image is repeatedly performed upon a fixed cycle. Or, the projector device may further comprise an actuation input device for receiving actuation input from a user, and the hue adjustment device may repeatedly perform the adjustment of the hue of the projection image each time actuation input is performed to the actuation device.

In the projector device described above, it is desirable that the projection image generation device projects the image including the predetermined shape pattern for a predetermined short time period, and that the photographic device photographs the projection image as the object to be photographed in synchronization with projection timing of the image.

In the projector device described above, the projector device may further comprise a setting device that sets a frequency of adjustment for the hue of the projection image, and when a first frequency of adjustment is set by the setting device, the hue adjustment device may perform adjustment of the hue of the projection image repeatedly during the projection of the projection image, when a second frequency of adjustment is set, the hue adjustment device may perform adjustment of the hue of the projection image only once during the projection of the projection image, and when a third frequency of adjustment is set, the hue adjustment device may not perform adjustment of the hue of the projection image.

Or, the projector device according to the present invention comprises a projection image generation device that projects an image including a predetermined drawing or symbol for specifying a shape of a projection image upon a projection surface and generates a projection image of the image, a photographic device that photographs an object to be photographed and acquires a photographic image of the object, and a trapezoidal compensation device that compensates trapezoidal deformation of the projection image created according to an angle between a projection direction of the projection image generation device and the projection surface, based upon the drawing or symbol included within the photographic image of the projection image which is acquired by photography by the photographic device.

Alternatively, the projector device according to the present invention comprises a body portion that has a construction to be folded around a hinge unit as a center and comprises a first portion and a second portion which are linked by the hinge unit, a detection device that detects a folding angle of the body portion, a projection image generation device that projects an image upon a projection surface and generates a projection image of the image, whose projection direction is fixed with respect to the first portion, and a trapezoidal compensation device that compensates trapezoidal deformation of the projection image created according to an angle between the projection direction of the projection image generation device and the projection surface, based upon the folding angle which is detected by the detection device.

Otherwise, the projector device comprises a body portion that comprises a first portion which has a construction to be rotated around a predetermined rotation shaft as a center and a second portion which is linked to the first portion, a detection device that detects a rotational angle of the first portion with respect to a predetermined reference position, a projection image generation device that projects an image upon a projection surface and generates a projection image of the image, whose projection direction is fixed with respect to the first portion, and a trapezoidal compensation device that compensates trapezoidal deformation of the projection image created according to an angle between the projection direction of the projection image generation device and the projection surface, based upon the rotational angle which is detected by the detection device.

In the projector device described above, the trapezoidal compensation device can repeatedly perform the compensation of the trapezoidal deformation during the projection of the projection image. At this time, it is desirable that the compensation of the trapezoidal deformation is repeatedly performed upon a fixed cycle. Or, the projector device may further comprise an actuation input device for receiving actuation input from a user, and the trapezoidal compensation device may repeatedly perform the compensation of the trapezoidal deformation each time actuation input is performed to the actuation device.

In the projector device described above, it is desirable that the projection image generation device projects the image including the drawing or symbol for a predetermined short time period, and that the photographic device photographs the projection image as the object to be photographed in synchronization with projection timing of the image.

In the projector device described above, the projector device may further comprise a setting device that sets a frequency of compensation of the trapezoidal deformation, and when a first frequency of adjustment is set by the setting device, the trapezoidal compensation device may perform compensation of the trapezoidal deformation repeatedly during the projection of the projection image, when a second frequency of adjustment is set, the trapezoidal compensation device may perform compensation of the trapezoidal deformation only once during the projection of the projection image, and when a third frequency of adjustment is set, the trapezoidal compensation device may not perform compensation of the trapezoidal deformation.

Or, the projector device according to the present invention comprises a projection image generation device whose projection focal point position is variable, that projects an image upon a projection surface and generates a projection image of the image, a photographic device whose photographic focal point position is variable, that photographs an object to be photographed and acquires a photographic image of the object, and a calibration control device that executes a calibration operation for adjusting an appearance of the projection image upon the projection surface, based upon the photographic image of the projection image which is acquired by photography by the photographic device. And, the projection image generation device generates the projection images for a plurality of different projection focal point positions, the photographic device acquires the photographic images of the plurality of projection images which is generated by the projection image generation device at the plurality of projection focal point positions, respectively at a plurality of photographic focal point positions at which the distances with respect to the projector device are respectively almost equal to those at the plurality of projection focal point positions, and the calibration control device executes the calibration operation based upon the photographic images of the plurality of projection images which is acquired by the photographic device at the plurality of photographic focal point positions.

Alternatively, the projector device according to the present invention comprises a projection image generation device whose projection focal point position is variable, that projects an image upon a projection surface and generates a projection image of the image, a photographic device whose photographic focal point position is variable, that photographs an object to be photographed and acquires a photographic image of the object, and a calibration control device that executes a calibration operation for adjusting an appearance of the projection image upon the projection surface, based upon the photographic image of the projection image which is acquired by photography by the photographic device. And, the projection image generation device generates the projection images for a plurality of different projection focal point positions, the photographic device acquires the photographic images of the plurality of projection images which is generated by the projection image generation device at the plurality of projection focal point positions, all at a single fixed photographic focal point position, and the calibration control device executes the calibration operation based upon the photographic images of the plurality of projection images which is acquired by the photographic device at the single photographic focal point position.

In the projector device described above, if the photographic images of the plurality of projection images which is acquired by the photographic device at the single photographic focal point position satisfy a predetermined condition, it is preferable that, after adjusting the photographic focal point position based upon the photographic images of the plurality of projection images, the generation of the plurality of projection images by the projection image generation device and the acquisition of the photographic images of the plurality of projection images by the photographic device are performed for a second time, with the photographic focal point position after adjustment. Or, in the projector device described above, the photographic device may acquire each of the photographic images of the plurality of projection images by fixing the photographic focal point position, so as to obtain a pan focus state in which the focus of the photographic images which are acquired is set from close to infinity.

In the projector device described above, the projector device may further comprise a state storage device that stores a state of the photographic focal point position before the projection image is photographed by the photographic device, and, after the generation of the projection image by the projection image generation device is stopped, or after the execution of the calibration operation by the calibration control device is stopped, the photographic focal point position may be returned to its state stored by the state storage device.

Or, the projector device according to the present invention comprises a projection image generation device that projects an image upon a projection surface and generates a projection image of the image, a photographic device that is capable of zooming, photographs an object to be photographed and acquires a photographic image of the object, a zooming control device that controls a zoom position of the photographic device, and a calibration control device that executes a calibration operation for adjusting an appearance of the projection image upon the projection surface, based upon the photographic image of the projection image which is acquired by photography by the photographic device. And, when photographing the projection image by the photographic device, the zooming control device controls the zoom position of the photographic device to a predetermined zoom position which is set in advance, so that a photographic range of the photographic device includes at least a projection range of the projection image.

In the projector device described above, it is desirable that the projector device further comprises a state storage device that stores a state of the zoom position before the projection image is photographed by the photographic device, and, after the generation of the projection image by the projection image generation device is stopped, or after the execution of the calibration operation by the calibration control device is stopped, it is desirable that the zoom position is returned to its state stored by the state storage device.

Or, the projector device according to the present invention comprises a projection image generation device that comprises a light source which emits light of a predetermined hue characteristic, projects an image by using light emitted from the light source upon a projection surface and generates a projection image of the image, a photographic device that photographs an object to be photographed and acquires a photographic image of the object, a hue adjustment device that adjusts a hue of the photographic image, and a calibration control device that executes a calibration operation for adjusting an appearance of the projection image upon the projection surface, based upon the photographic image of the projection image which is acquired by photography by the photographic device. And, when photographing the projection image by the photographic device, the hue adjustment device adjusts the hue of the acquired photographic image based upon predetermined color conversion rules set in advance according to the hue characteristics of the light source.

In the projector device described above, it is desirable that the projector device further comprises a state storage device that stores a state of color conversion rules by the hue adjustment device before the projection image is photographed by the photographic device, and, when the projection image is not being photographed by the photographic device, it is desirable that the hue of the photographic image is adjusted by the hue adjustment device, based upon color conversion rules which are different from the predetermined color conversion rules, and after the generation of the projection image by the projection image generation device is stopped, or after the execution of the calibration operation by the calibration control device is stopped, it is desirable that the state of the color conversion rules for the hue adjustment device is returned to its state stored by the state storage device.

Or, the projector device according to the present invention comprises a projection image generation device that projects an image upon a projection surface and generates a projection image of the image, a photographic device that photographs an object to be photographed and acquires a photographic image of the object, a photographic direction change mechanism that changes a photographic direction of the photographic device, a calibration control device that executes a calibration operation for adjusting an appearances of the projection image upon the projection surface, based upon the photographic image of the projection image which is acquired by photography by the photographic device, a decision device that decides whether or not a projection direction of the projection image generation device and the photographic direction of the photographic device are the same direction, and a warning device that emits a warning when it is decided by the decision device that the projection direction and the photographic direction are not the same direction.

Alternatively, the projector device according to the present invention comprises a projection image generation device that projects an image upon a projection surface and generates a projection image of the image, a photographic device that photographs an object to be photographed and acquires a photographic image of the object, a photographic direction change mechanism that changes a photographic direction of the photographic device, a calibration control device that executes a calibration operation for adjusting an appearance of the projection image upon the projection surface, based upon the photographic image of the projection image which is acquired by photography by the photographic device, a decision device that decides whether or not the projection direction of the projection image generation device and the photographic direction of the photographic device are the same direction, and an operation permission device that permits an operation of the projection image generation device only if it is decided by the decision device that the projection direction and the photographic direction are the same direction.

The portable telephone according to the present invention comprises the projector device any one of which described above and a wireless communication device that performs communication with another terminal via an external wireless communication facility. And the camera according to the present invention comprises the projector device any one of which described above.

It should be noted that each of the devices described above can be replaced by a means for achieving same function. Namely, the projection image generation device may be replaced by a projection image generation means. Moreover, a photographic means may be used instead of the photographic device. Similarly, the calibration control device may be replaced by a calibration control means and the actuation input device may be replaced by an actuation input means. A setting means can be used in place of the setting device.

In the same manner as described above, the focusing device may be replaced by a focusing means. The brightness adjustment device may be replaced by a brightness adjustment means. The hue adjustment device may be replaced by a hue adjustment means. The trapezoidal compensation device may be replaced by a trapezoidal compensation means. The detection device may be replaced by a detection means. The zooming control device may be replaced by a zooming control means. The state storage device may be replaced by a state storage means. The decision device may be replaced by a decision means. The warning device may be replaced by a warning means. The operation permission device may be replaced by an operation permission means. The wireless communication device may be replaced by a wireless communication means.

EFFECT OF THE INVENTION

According to the present invention, it is possible to implement a handy type projection type liquid crystal projector which can easily be used, by performing various types of operation which have not been needed in the case of a prior art stand-mounted type projection type liquid crystal projector.

BRIEF DESCRIPTION OF THE DRAWINGS

FIG. 4 is a figure showing a situation in which an image for contrast calculation has been superimposed upon an image which is a subject for projection;

FIG. 6 is a figure showing a situation in which an image for brightness detection has been superimposed upon an image which is a subject for projection;

FIG. 7 is a figure showing a situation in which a drawing for shape specification has been superimposed upon an image which is a subject for projection;

FIG. 9 is a figure showing a relationship between rotational angle φ and trapezoidal deformation;

DESCRIPTION OF THE SYMBOLS

Figure 1:
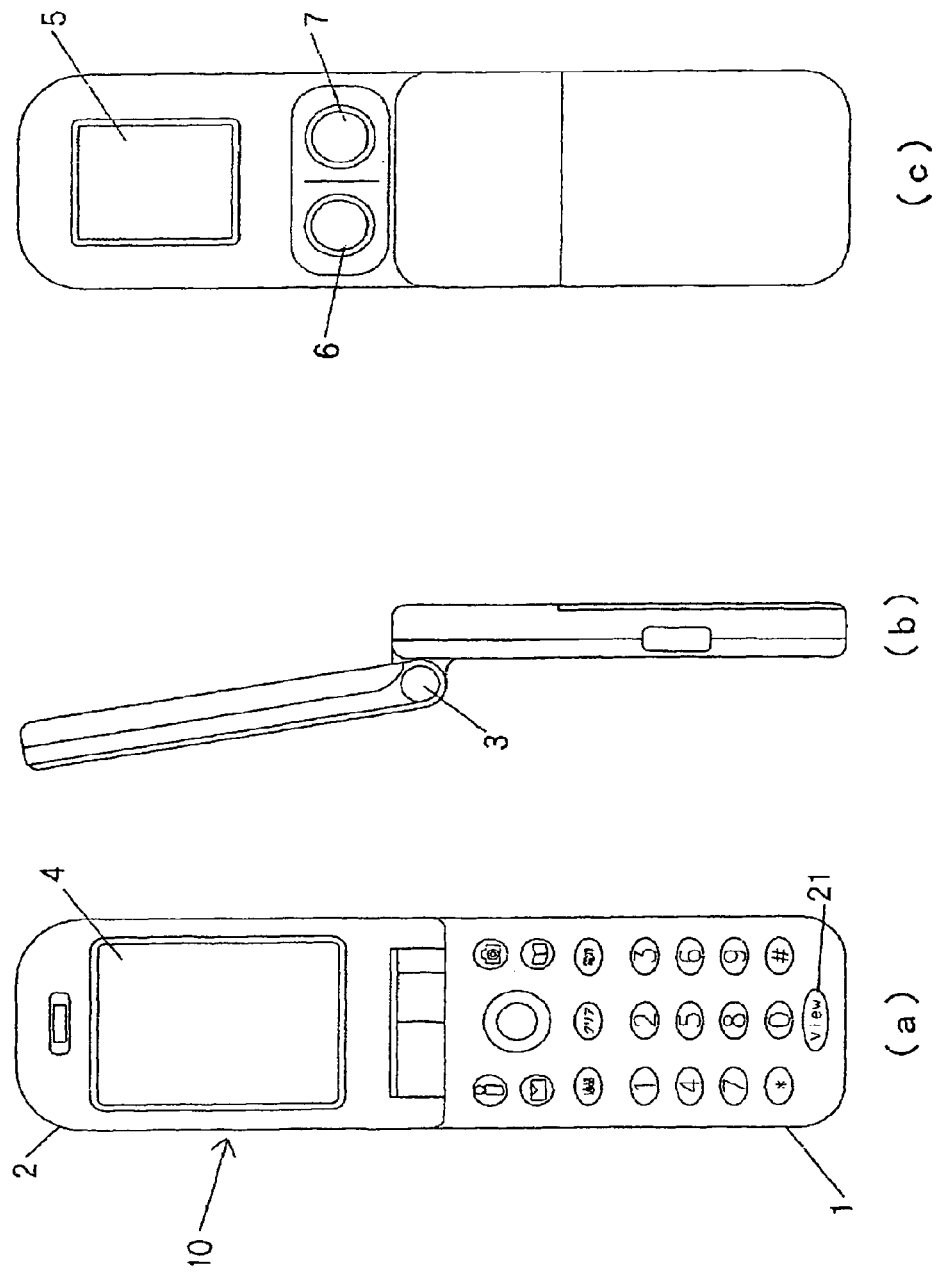
FIG. 1 is a figure showing the external appearance of a portable telephone device with incorporated projector according to an embodiment of the present invention.

1: actuation section
2: display section
3: folding hinge unit
4: main liquid crystal display device
5: sub-liquid crystal display device
6: projector module
7: camera module
10: portable telephone device with incorporated projector
61: projection lens
62: liquid crystal panel
63: LED light source
64: LED drive unit
65: liquid crystal drive unit
66: lens drive unit
71: photographic lens
72: image sensor
73: lens drive unit
74: camera control CPU
101: CPU
102: memory
103: short distance communication unit
104: memory card
105: mike
106: external interface
107: power supply
108: communication control unit
109: antenna
110: actuation key group
111: speaker
112: opening and closing angle sensor

BEST MODE FOR CARRYING OUT THE INVENTION

First Embodiment

In the following, a first embodiment for implementation of the present invention will be explained with reference to the drawings. FIG. 1 is a figure showing the external appearance of a portable handy type portable telephone device with incorporated projector 10 according to an embodiment of the present invention according to this first embodiment. (a) shows an elevation view, (b) shows a side view, and (c) shows a rear view. In FIG. 1, the body of this portable telephone device with incorporated projector 10 consists of an actuation section 1 and a display section 2, and the actuation section 1 and the display section 2 are linked together via a folding hinge unit 3 which can be rotated. In other words, this portable telephone device with incorporated projector 10 has a folding construction, and can be folded about the folding hinge unit 3 as a rotational center.

Various types of actuation key for receiving actuation input from the user are provided to the actuation section 1. Among these actuation keys, there are included certain keys which are the same as on a conventional portable telephone, and which are endowed with a camera function, an email transmission and reception function, a function of connection to the Internet, and the like. For example, there are included actuation keys for starting or ending a telephone conversation, actuation keys for inputting a telephone number or characters or the like, cursor keys for screen actuation, actuation keys for transitioning to various types of operational mode such as a camera photography mode, an email transmission and reception mode, an internet connection mode, and the like. In addition to the same actuation keys as are provided upon a conventional portable telephone device, the actuation section 1 is also provided with an actuation key for transitioning to a mode for projecting an image using a projector module 6 which will be described hereinafter (i.e. a projector mode). For example, when an actuation key denoted by the reference symbol 21 is pressed, the system transitions to the projector mode, in which an image created as will be described hereinafter is projected by the projector module 6 upon a projection surface such as a screen or a wall surface or the like, so that a projection image of this image is created.

A main liquid crystal display device 4 is disposed upon the front side of the display section 2, and a sub-liquid crystal display device 5 is disposed upon its rear surface side. A projector module 6 and a camera module 7 are also disposed upon the rear surface side of the display section 2.

Figure 2:
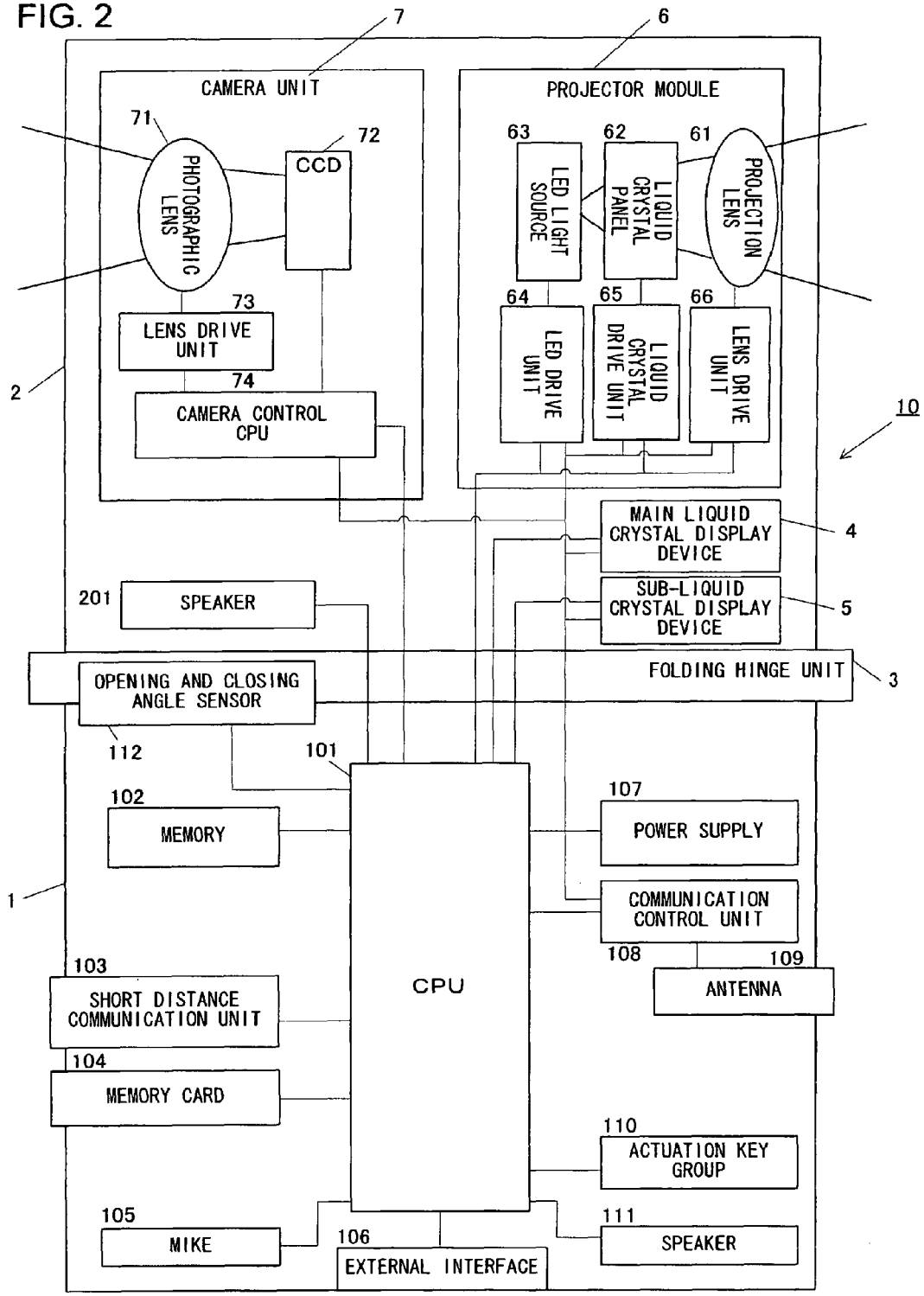
FIG. 2 is a block diagram of this portable telephone device with incorporated projector.

FIG. 2 is a block diagram of this portable telephone device with incorporated projector 10 of FIG. 1. In FIG. 2 there are provided, on the side of the actuation section 1, a CPU 101, a memory 102, a short distance communication unit 103, a mike 105, an external interface (I/F) 106, a power supply 107, a communication control unit 108, an antenna 109, an actuation key group 110, a speaker 111, and an opening and closing angle sensor 112; and a removable memory card 104 is also implemented.

On the side of the display section 2, there are provided the main liquid crystal display device 4, the sub liquid crystal device 5, the projector module (projector unit) 6, a camera module (camera unit) 7, and a speaker 201.

Based upon a control program, the CPU 101 performs predetermined calculation and the like using signals inputted from various units incorporated in this portable telephone device with incorporated projector 10, and controls each of telephone device operation, camera operation, and projector operation by sending control signals to various units of this portable telephone device with incorporated projector 10. It should be understood that this control program is stored in a non-volatile memory (not shown in the figures) within the CPU 101.

The memory 102 is used as a working area for the CPU 101. The short distance communication unit 103 may comprise, for example, an infrared radiation communication circuit, and transmits and receives data to and from an external device upon command by the CPU 101. Furthermore, the external interface 106 transmits and receives data to and from an external device via a cable or a cradle, not shown in the figures, upon command by the CPU 101. And, by using the short distance communication unit 103 or the external interface 106, it is possible to input various types of image or voice data from an external device.

The memory card 104 comprises a non-volatile memory, and, upon command by the CPU 101, it is capable of writing, storing, and reading out data such as, for example, image data outputted by the camera module 7, images and audio data inputted from an external device via the short distance communication unit 103 or the external interface 106, and the like.

The mike 105 converts audio which has been captured into an electrical signal and sends it to the CPU 101. This audio signal is recorded in the memory card 104 during sound recording, and is sent to the communication control unit 108 during telephone conversation. The speaker 111 replays the audio of an audio signal outputted from the CPU 101. The actuation key group 110 summarizes in a single block the various types of actuation key described above, and sends an actuation signal to the CPU 101 corresponding to the actuation key which is depressed. The communication control unit 108 includes a wireless transmission and reception circuit, and performs communication with other telephone devices via a base station not shown in the figures, upon command by the CPU 101. This communication control unit 108 is adapted so as to be able to transmit and receive, not only telephone audio, but also image data which has been photographed by the camera module 7, image data for projection by the projector module 6, and the like. And the antenna 109 is a transmission and reception antenna for the communication control unit 110.

The power supply 107 may consist of, for example, a removable battery pack and a DC/DC conversion circuit or the like, and supplies the various sections within the portable telephone device with incorporated projector 10 with the electrical power which they require. The opening and closing angle sensor 112 detects the rotational angle of the folding hinge unit 3, in other words the folding angle θ of the portable telephone device with incorporated projector 10, and sends it to the CPU 101.

The main liquid crystal display device 4 and the sub liquid crystal display device 5 each displays information such as an image or text or the like upon a command from the CPU 101. And, during telephone conversation, the speaker 201 replays audio which is outputted from the CPU 101 as a sound signal.

The projector module 6 comprises a projection lens 61, a liquid crystal panel 62, a LED light source 63, a LED drive unit 64, a liquid crystal drive unit 65, and a lens drive unit 66. The LED drive unit 64 supplies electrical current to the LED light source 63 according to a LED drive signal which is outputted from the CPU 101. And the LED light source 63 irradiates respective R (red), G (green), and B (blue) primary colored light according to the electrical current which is supplied, and illuminates the liquid crystal panel 62 therewith. By synthesizing these lights of various colors, white colored light is irradiated from the LED light source 63. It should be understood that the intensities of these various colored R, G, and B lights can be adjusted individually according to the electrical current intensities from the LED drive unit 64.

The liquid crystal drive unit 65 generates a liquid crystal panel drive signal corresponding to the image data, and, by driving the liquid crystal panel 62 with this generated drive signal, an image is displayed upon the liquid crystal panel 62. In concrete terms, in the liquid crystal layer, a voltage is applied to each of the picture elements in correspondence to the image signal. The arrangement of the liquid crystal molecules changes in the liquid crystal layer to which voltage has thus been applied changes, so that the optical transmittance of this liquid crystal layer changes. The image is displayed due to this change of transmittance. It should be understood that the liquid crystal panel 62 is provided with a color filter, and each of the picture elements corresponds to one of the colors R, G, and B. Due to this, a color image is displayed upon the liquid crystal panel 62 by combining these picture elements of the colors R, G, and B.

The image displayed upon the liquid crystal panel 62 can be selected from among various types of image, such as images stored upon the memory card 104, images which have been inputted from an external device, images which have been photographed by the camera module 7 as will be described hereinafter, and the like. It would also be acceptable for it to be the same as the image which is being displayed upon the main liquid crystal display device 4 or the sub liquid crystal display device 5, or to be a moving image (a video image). Furthermore, it would also be acceptable to arrange for an email document or the like to be selected and displayed.

After displaying an image which has been selected as explained above upon the liquid crystal panel 62, white colored light synthesized from the lights of the three colors R, G, and B irradiated from the LED light source 63 is passed through, so that an optical image of the image displayed upon the liquid crystal panel 62 is created. And the lens drive unit 66 drives the projection lens 61 forwards and backwards along the direction of the optical axis, based upon a control signal outputted from the CPU 101. Adjustment of the focus state of the projection image is performed by varying the focal point position of the projection lens 61 in this manner, as will be explained hereinafter. The projection lens 61 projects the optical image emitted from the liquid crystal panel 62 towards a projection surface such as a screen or the like. By doing this, the image which has been selected is projected upon the projection surface using the white colored light which has been synthesized from the R, G, and B lights, so that a projection image of this image is generated.

The camera module 7 comprises the photographic lens 71, an image sensor 72, a lens drive unit 73, and a camera control CPU 74. As the image sensor 72, a CCD or CMOS photographic element or the like may be used. The camera control CPU 74 controls the image sensor 72 and the lens drive unit 73 upon a command from the CPU 101. And the lens drive unit 73 changes the focal point position of the photographic lens 71 by driving a focal point adjustment lens (not shown in the figures) which is included in the photographic lens 71 in forwards and backwards direction along the optical axis, according to a control signal from the camera control CPU 74. By doing this, adjustment of the image of the object to be photographed is performed.

The photographic lens 71 images an image of the object to be photographed upon the photographic surface of the image sensor 72. The camera control CPU 74 starts photography upon the image sensor 72, and, after the end of photography, reads out an accumulated electric charge signal from the image sensor 72, and, after having performed predetermined signal processing thereupon, sends it to the CPU 101 as image data. It should be understood that, when image data which has been photographed by the camera module 7 is to be transmitted, image data is sent from the CPU 101 to the communication control unit 108. Furthermore, when a photographic image is to be projected, image data is sent from the camera control CPU 74 via the CPU 101 to the projector module 6. In this manner, a photographic image of the object which has been photographed by the camera module 7 is acquired.

Figure 3:
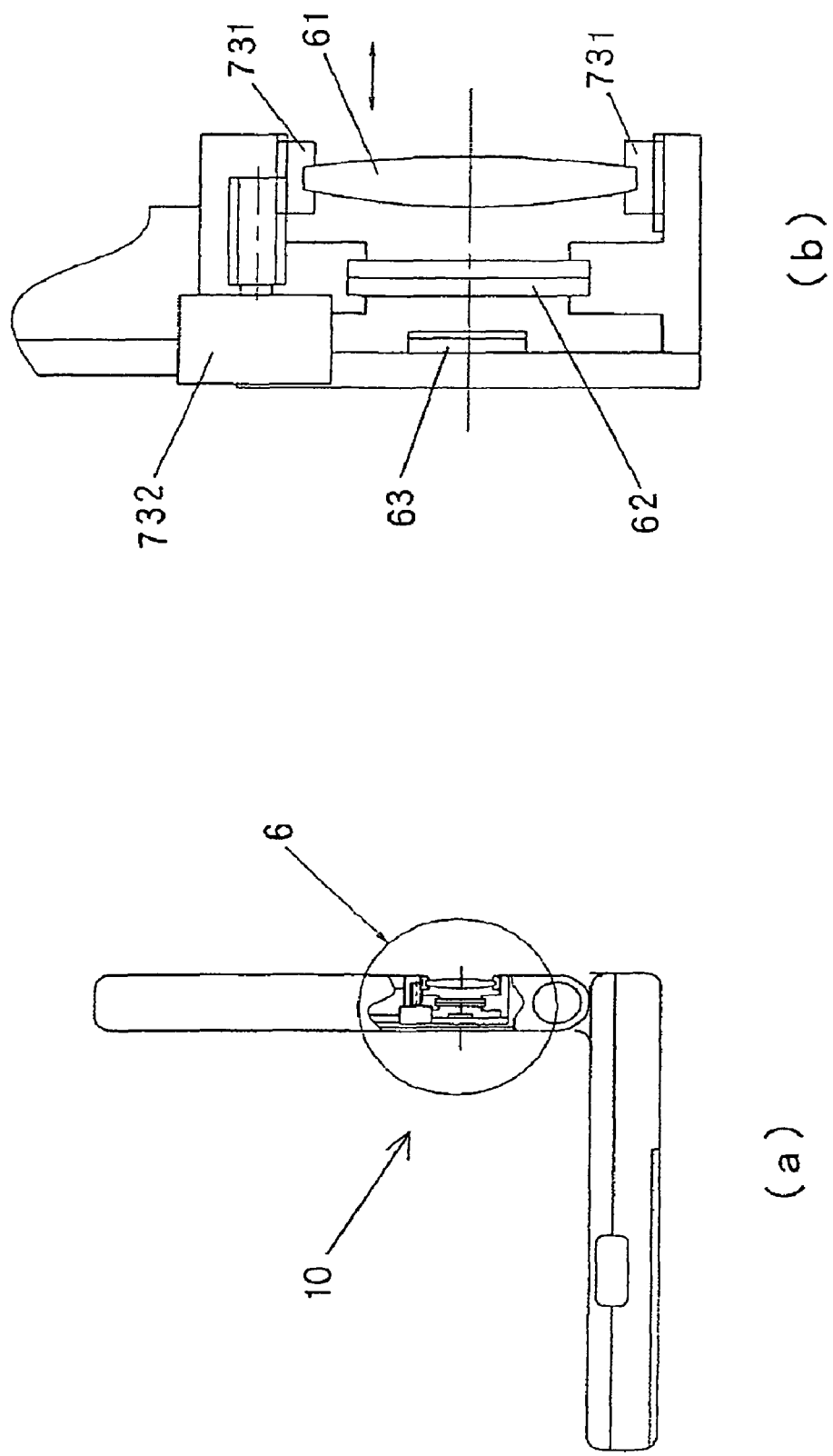
FIG. 3 is a sectional view of a projector module.

FIG. 3 is a sectional view of the projector module 6. (a) is a figure showing a sectional view of the projector module 6 in side view, while (b) is an enlarged view thereof. The lens drive unit 73 of FIG. 2 comprises a lens support unit 731 and a drive motor 732. The lens support unit 731 is arranged above and below the projection lens 61 and supports it. The drive motor 732 can adjust the gap between the liquid crystal panel 62 and the LED light source 63, and the projection lens 61, by shifting the position of the lens support unit 731 to and fro in the left and right direction in the figure with its drive operation. Due to this, it is possible to adjust the focus state of the projection image. It should be understood that the LED drive unit 64 and the liquid crystal drive unit 65 of FIG. 2 are omitted from FIG. 3.

Next, the details of the operation when projecting an image with this portable telephone device with incorporated projector 10 will be explained. During the projection of a projection image, this portable telephone device with incorporated projector 10 repeatedly executes operation for adjusting the appearance of the projection image on a projection surface generated by the projector module 6. This calibration operation is classified into the following operations: (1) focus state adjustment; (2) brightness adjustment; (3) white balance adjustment; and (4) trapezoidal deformation compensation. Each of these operations will be explained in the following in order.

(1) Adjustment of the Focus State

If the focus state of the image projected by the projector module 6 is not appropriate, in other words if the focal point of the projected image is not correctly matched to the distance to the projection surface, then the focus is deviated, and the projected image appears undesirably blurred. In order to project an image whose focus is properly adjusted, it is necessary to adjust it to an appropriately focused state. This adjustment of the focus state of the projection image is performed in the following manner, based upon a photographic image of the projection image which is acquired by photography with the camera module 7.

While projecting an image with the projector module 6, this portable telephone device with incorporated projector 10 photographs the projection image using the camera module 7. The photographic image of the projection image which has been thus acquired with the camera module 7 is outputted to the CPU 101. The CPU 101 decides whether or not the focus state of the projection image is appropriate by detecting any blurred state of the photographic image outputted from the camera module 7. If the photographic image is blurred, then it is decided that the focus state is not appropriate, and the projection lens 61 is driven using the lens drive unit 66. By doing this, and by driving the projection lens 61 until the blurring of the photographic image is eliminated, the focus state of the projection image is adjusted, so that it is ensured that an appropriate focus state is established.

The above described adjustment of the focus state may be performed by the same method as a contrast detection method which is widely used when adjusting the focal point position of a digital camera. In other words, photographic images are acquired while varying the focal point position of the projection lens 61 in various manners, and the contrast amount of each of these photographic images is calculated. And the contrast amounts of the various photographic images are compared together, and the focal point position of the projection lens 61 is set to the position when the photographic image whose contrast amount is maximum was acquired. By doing this, it is possible to adjust the focus state of the projection image in an appropriate manner. It should be understood that, although it is necessary to perform focus adjustment and white balance adjustment of the camera module 7 at this time, this point will be explained hereinafter.

However, if the projection image itself varies during adjustment of the focus state of the projection image, then since the contrast amount of the photographic image changes due to this, which is undesirable, accordingly it becomes impossible to obtain a proper adjustment result. In particular, if a moving image is being projected, then, since the projection image is always changing, it is impossible to adjust the focus state of the projection image. Thus, with this portable telephone device with incorporated projector 10, after a predetermined image for calculating the contrast amount (hereinafter termed an "image for contrast calculation") has been superimposed upon the image which has been selected as the subject for projection, this is projected by the projector module 6, and the projection image is photographed by the camera module 7. By doing this, the portion where the image for contrast calculation is superimposed does not vary, even if the image which is the original subject for projection varies. Accordingly, by calculating the contrast amount for the image for contrast calculation, and by adjusting the focus state of the projection image based upon this contrast amount, it is possible to adjust the focus state of the projection image in an appropriate manner even during projection of a moving image.

FIG. 4 is a figure showing a situation in which an image for contrast calculation has been superimposed upon the image which is the subject for projection. (a) shows the original image which is the subject for projection, while (b) shows the subject image for projection with the image for contrast calculation superimposed thereupon. In the image of (b), in addition to the file name and date information in its lower edge portion, also the image for contrast calculation denoted by the reference symbol 21 is superimposed. This image for contrast calculation has a pattern of a predetermined shape, in which, in order to make the contrast amount easy to calculate, a plurality of vertical lines are lined up together. The image which includes the image for contrast calculation formed by this type of predetermined pattern is projected upon the projection surface by the projector module 6, and this projection image is photographed by the camera module 7. Using the photographic image which has been acquired in this manner, the contrast amount is calculated based upon the image for contrast calculation 21, and adjustment of the focus state of the projection image is performed. It should be understood that the shape of the pattern of the image for contrast calculation 21 shown here is only one possible example; it goes without saying that it would also be acceptable to employ a pattern of any shape, provided that it enabled the contrast amount to be calculated.

Moreover, it should be understood that, in the calculation of the contrast amount as described above, among all the photographic signals (the accumulated electric charge signals) outputted by the picture element units in the image sensor 72 of the camera module 7, only the photographic signals which are outputted by the picture elements in the region which corresponds to the image for contrast calculation 21 are used.

Figure 5:
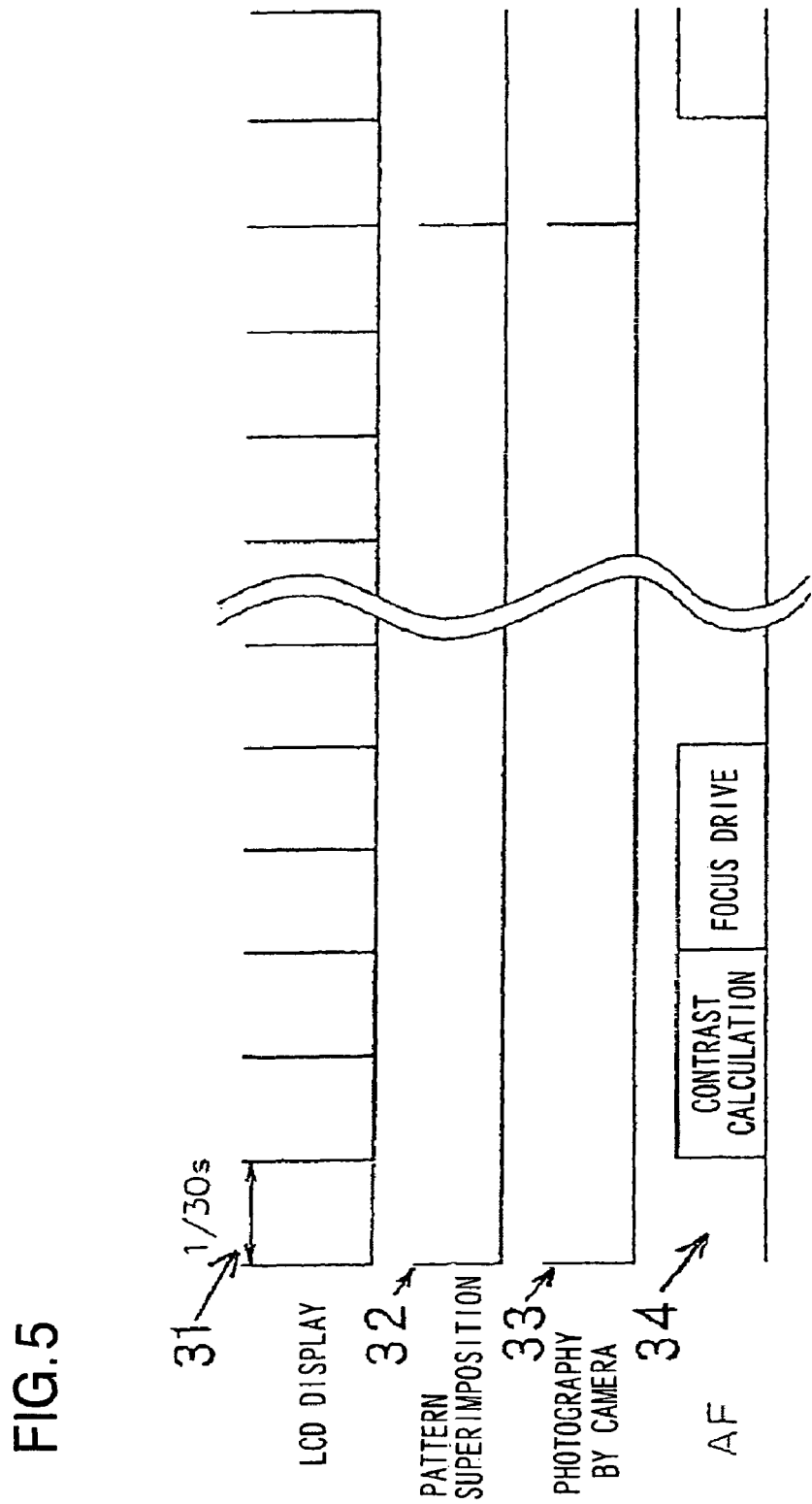
FIG. 5 is a timing chart showing the timing of superimposing this image for contrast calculation.

Here, it is not necessary always to superimpose the image for contrast calculation as explained above; it would also be acceptable to arrange to do so for only a predetermined short time period. By doing this, it is possible to make it difficult for a person who is viewing the projection image to notice that the image for contrast calculation has been superimposed. FIG. 5 is a timing chart for explanation of this situation. The image which is displayed upon the liquid crystal panel 62 is updated once every $1/30$ sec, as shown by the reference symbol 31. In other words, image display of 30 frames is performed during one second.

The superimposition of the image for contrast calculation is performed at fixed frame intervals, at a timing shown by the reference symbol 32. An image which includes this image for contrast calculation is projected at this timing, and at other timings, the image is projected without the image for contrast calculation being superimposed thereupon. Moreover, at this time, acquisition of photographic images by the camera module 7 is performed at a timing shown by the reference symbol 33. In other words, in synchronism with the timing at which the image including the image for contrast calculation is projected, the projection image is photographed by the camera module 7. In this manner, calculation of the contrast amount and adjustment of the focus state of the projection image is performed at a timing shown by the reference symbol 34, based upon the shape pattern portion of the image for contrast calculation in the photographic image which is photographed.

Furthermore, it would also be acceptable to arrange for the adjustment of the focus state of the projection image to be performed repeatedly at a fixed cycle, as explained above. Or, it would also be acceptable to arrange for this focus adjustment to be performed repeatedly, each time input actuation is performed upon an actuation key of the portable telephone device with incorporated projector 10. Sometimes, when input actuation is performed upon an input key, this causes the position or the orientation of the portable telephone device with incorporated projector 10 to change, so that the projection image wobbles. Accordingly, if it is arranged to perform the adjustment of the focus state of the projection image each time input actuation is performed upon an actuation key, then, even if the projection image has wobbled, it is possible to ensure that the projection image can be compensated easily for this.

Or, it would also be acceptable to arrange for it to be possible to set the frequency of adjustment of the focus state. For example, it may be made possible to set three types of adjustment frequency, and then, if the highest frequency of adjustment has been set, adjustment of the focus state is performed repeatedly during projection of the projection image, as explained above. On the other hand, if the intermediate frequency of adjustment has been set, then adjustment of the focus state is only performed during the projection of a projection image for the first time; while, if the lowest frequency of adjustment has been set, then it is arranged not to perform adjustment of the focus state of the projected image. By arranging matters in this manner, it is possible to keep the consumption of electrical power down when adjustment of the focus state of the projection image is unnecessary. It should be understood that it may be arranged to perform setting of the frequency of adjustment by input actuation of an actuation key, or the like.

In the explanation described above, it was arranged to adjust the focus state of the projection image even during projection of a moving image, by superimposing the image for contrast calculation. However, if the image which is being projected is a still image, then it is possible to calculate a contrast amount based upon this still image, and to adjust the focus state of the projection image appropriately. Accordingly, it would also be acceptable to arrange to adjust the focus state of the projection image when only the still image is being projected, without superimposing any image for contrast calculation. Moreover, it would also be possible to arrange to superimpose an image for contrast calculation during projection of a moving image, while not superimposing any image for contrast calculation during projection of a still image, and to calculate a contrast amount and to adjust the focus state of the projection image, based upon either the image for contrast calculation or the still image.

(2) Adjustment of the Brightness

Next, the adjustment of the brightness will be explained. When projection is not being performed by the projector module 6 with an appropriate brightness, since the projection image is difficult to view due to it being too dark or too bright, which is undesirable, accordingly it is necessary to adjust the brightness of the projection image in an appropriate manner. This adjustment of the brightness of the projection image is performed based upon a photographic image photographed and acquired by the camera module 7, in the same manner as the adjustment of the focus state, previously described.

In this portable telephone device with incorporated projector 10, it is decided whether or not the brightness of the projection image is appropriate by the brightness of the photographic image outputted from the camera module 7 being detected by the CPU 101. If the photographic image is too dark or too bright overall, then it is decided that the brightness of the photographic image is not appropriate, and the electrical current supplied from the LED drive unit 64 to the LED light source 63 is increased or decreased. The light emission intensity of the LED light source 63 is varied according to the supply current amount from the LED drive unit 64, so that the brightness of the projection image varies. By doing this, adjustment is performed so that the brightness of the projection image becomes appropriate.

It should be understood that, if the LED light source 63 is performing PWM illumination, then it would also be acceptable to arrange to adjust the brightness of the projection image by varying the duty ratio thereof. In other words, if the LED light source is a light source which emits light in the form of pulses, then it is possible to make the projection image brighter by widening this pulse width; and, conversely, it is also possible to make the projection image darker by narrowing the pulse width. Moreover, in a case such as when the LED light source 63 emits light of each color of R, G, and B with a plurality of groups, and when it is possible to control the turning ON and OFF of illumination by each group individually, then it is also possible to adjust the brightness of the projection image by varying the number thereof which are lit up together. According to the methods explained above, it is possible to adjust the brightness of the projection image by varying the light emission amount of the LED light source 63.

With this portable telephone device with incorporated projector 10, when adjusting the brightness of the projection image based upon the photographic image in the manner described above, after having superimposed a predetermined image for detecting the brightness (hereinafter termed the "image for brightness detection") upon the image which has been selected as a subject for projection, this is projected with the projector module 6, and the projection image is photographed with the camera module 7. By doing this, it is possible to perform appropriate adjustment of the brightness of the projection image, based upon the brightness of the portion over which the image for brightness detection is superimposed, even if the original image which is the subject for projection changes.

FIG. 6 is a figure showing a situation in which an image for brightness detection has been superimposed upon the image which is the subject for projection. (a) shows the original subject for protection image, while (b) shows the image in which the image for brightness detection has been superimposed upon this subject for protection image. In the image of (b), in the same manner as in the image of FIG. 4(*b*) in which the image for contrast calculation was superimposed, in its lower edge portion, in addition to the file name and date information, the image for brightness detection shown by the reference symbol 22 is superimposed. This image for brightness detection 22 has a pattern in a predetermined shape, which is colorless (i.e. white colored) all over, so that its brightness can be detected easily. An image including an image for brightness detection formed in a pattern with this type of predetermined shape is projected upon the projection surface by the projector module 6, and this projection image is photographed by the camera module 7. Using the photographic image which has been acquired in this manner, the brightness thereof is detected based upon the image for brightness detection 22, and adjustment of the brightness of the projection image is performed. It should be understood that the pattern and shape of the image for brightness detection 22 shown here are given as an example; it goes without saying that it would also be acceptable to use a pattern and shape of any type, provided that it enables brightness detection.

It should be understood that, in the detection of the brightness as described above, among the photographic signals (the accumulated electric charge signals) which are outputted by the image sensor 72 of the camera module 7 in units of picture elements, only those photographic signals are used which are outputted by picture elements in the region which corresponds to the image for brightness detection 22.

It would also be acceptable, in the same manner as in the case of the image for contrast calculation described above, to arrange for the superimposition of the image for brightness detection to be performed as explained above for only a predetermined short time period. In this case, the projection image would be photographed by the camera module 7 in synchrony with the timing at which the image including the image for brightness detection is projected.

Furthermore, in the same manner as in the case of the adjustment of the focus state described previously, it would also be acceptable to arrange to perform this adjustment of the brightness of the projection image as well repeatedly at a fixed cycle, or to repeat it each time input actuation is performed upon an actuation key for this portable telephone device with incorporated projector 10. This is because, when input actuation upon an actuation key is performed, sometimes the position or the orientation of the portable telephone device with incorporated projector 10 changes due to this input actuation, so that the distance thereof to the projection surface may vary, which can cause the brightness of the projection image to vary undesirably. Accordingly, if it is arranged to perform adjustment of the brightness of the projection image each time input actuation is performed upon an actuation key, then it is possible to ensure that brightness compensation is performed and an easily visible projection image is obtained, even if the brightness of the projection image changes due to this input actuation.

Or, in the same manner as in the case of the adjustment of the focus state, it would also be acceptable to arrange for it to be possible to set the frequency of adjustment of the brightness, among three levels of adjustment frequency, according to the input actuation of an actuation key. In other words, if the highest frequency of adjustment has been set, then adjustment of the brightness is performed repeatedly during projection of the projection image, as explained above; while, if the intermediate frequency of adjustment has been set, then adjustment of the brightness is only performed during the projection of a projection image for the first time; and, if the lowest frequency of adjustment has been set, then it is arranged not to perform adjustment of the brightness of the projected image. By arranging matters in this manner, it is possible to keep the consumption of electrical power down when adjustment of the brightness of the projection image is unnecessary.

In the above described explanation, it was arranged to adjust the brightness of the projection image by varying the light emission amount of the LED light source 63. However, it is desirable to keep down the light emission amount as much as possible, since increase of the light emission amount entails increase of the amount of electrical power consumption and also of the heat generation amount. Accordingly, it would also be acceptable to arrange to set a predetermined reference value for the brightness of the projection image in advance, and to adjust the brightness of the projection image by decreasing the light emission amount, only when it is desired to make the brightness darker than this reference value. In this case, when the brightness is brighter than the reference value, the brightness of the projection image is adjusted by changing the brightness of the image itself which is the subject for projection, displayed upon the liquid crystal panel 62. For change of the hue at this time, it is possible to use a method of so called LUT (Look Up Table) processing or gamma compensation processing or the like. In LUT processing, the color information value for each picture element in the image data is compensated according to a correspondence relationship expressed as a table. In gamma compensation processing, the color information value for each picture element in the image data is compensated according to a so called gamma conversion curve. It should be understood that it would also be acceptable to arrange to change the brightness of the subject image for projection using some other type of method.

(3) Adjustment of the White Balance

Next, the adjustment of the white balance will be explained. If the hue of the projection image is not adjusted by the projector module 6, sometimes it happens, due to the ambient light distribution situation or the hue of the projection surface, that, to the eye viewing the projection image, it appears to be different from its proper hue, which is undesirable. Accordingly, it is necessary to perform white balance adjustment so that the projection image is seen in its proper hue. This adjustment of the white balance of the projection image is performed based upon a photographic image of the projection image, which has been acquired by photography by the camera module 7, just as in the case of the adjustment of the focus state or of the brightness described above.

With this portable telephone device with incorporated projector 10, a decision is made as to whether the white balance of the projection image is appropriate or not, by the CPU 101 detecting the hue of an image which is photographed by and outputted from the camera module 7. If the detected hue is different from the proper hue, then the electrical current supplied to the LED light source 63 from the LED drive unit 64 is increased or decreased for each of the colors R, G, and B. The light emission intensity by the LED light source 63 for each of the colors R, G, and B is thus varied individually according to the electrical current amount supplied from the LED drive unit 64, and thereby the hue of the projection image is varied. By adjusting the hue in this manner, the white balance of the projection image can be adjusted so that it becomes appropriate.

It should be understood that, in the same manner as when adjusting the brightness as described previously, if the LED light source 63 is performing PWM illumination, then it would also be acceptable to arranged to adjust the projection image by varying the duty ratio for each of the colors R, G, and B. In other words, if the LED light source is a light source which emits light in pulse form for each of the colors R, G, and B, then it is possible to make the hue of some light emission color stronger by widening its pulse width, and conversely to make the hue of some light emission color weaker by narrowing its pulse width. Moreover, in a case such as when the LED light source 63 emits light of each color of R, G, and B with a plurality of groups, then it is also possible to adjust the hue of the projection image by varying the number thereof which are lit up together. According to the methods explained above, it is possible to adjust the hue of the projection image by varying the light emission amounts of the LED light source 63 for each of its light emission colors, so that it is possible to perform adjustment of the white balance of the projection image.

With this portable telephone device with incorporated projector 10, if the white balance of the projection image is adjusted based upon a photographic image as described above, then, after having superimposed a predetermined image (hereinafter termed the "image for hue detection") for detecting the hue upon the image which has been selected, this image is projected by the projector module 6 and the projection image is photographed with the camera module 7. When this is done, then it is possible to adjust the white balance of the projection image in an appropriate manner based upon the hue of the portion thereof which is the image for hue detection which has been superimposed, even if the original image which is the subject for projection changes.

The image for hue detection described above can also serve as the image for brightness detection 22 shown in FIG. 6(*b*). This image for hue detection (image for brightness detection) 22 has a pattern of a predetermined shape, which is all white color. Accordingly, in the photographic image which has been acquired by the camera module 7, the hue is detected based upon the image for hue detection (image for brightness detection) 22, and it is possible to perform the white balance adjustment by comparing this hue with proper white color. It should be understood that it goes without saying that, apart from the above, a pattern of any shape would also be acceptable, provided that it was one with which white balance adjustment could be performed. It would also be acceptable to arrange to use a portion in white color upon the image for contrast calculation which was used for the adjustment of the focus state of the projection image, also as the image for hue detection or as the image for brightness detection.

Moreover, it should be understood that, in the detection of hue described above, among the photographic signals (the accumulated electric charge signals) which are outputted by the picture element units in the image sensor 72 of the camera module 7, only those photographic signals which are outputted by the picture elements in the regions corresponding to the image for hue detection 22 are used.

It would also be acceptable, in the same manner as with the image for contrast calculation or the image for brightness detection as described previously, to perform the superimposition of the image for hue detection for only a predetermined short time period. In this case, the projection image is photographed by the camera module 7 in synchronization with the timing at which the image which includes the image for hue detection is projected.

Furthermore, it would also be acceptable to arrange for this adjustment of the white balance to be performed repeatedly at a fixed cycle, as with the adjustment of the focus state or the adjustment of the brightness explained above; or, it would also be acceptable to arrange for this white balance adjustment to be performed repeatedly, each time input actuation is performed upon an actuation key of the portable telephone device with incorporated projector 10. Sometimes, when input actuation is performed upon an input key, this causes the position or the orientation of the portable telephone device with incorporated projector 10 to change, so that the position of the projection image changes. At this time sometimes, due to the position of the projection image having changed, the situation with regard to the ambient light distribution or the hue of the projection surface changes, and as a result the color of the projection image, as it appears to the eye of the viewer, may change, which is undesirable. Accordingly, if it is arranged to perform the adjustment of the white balance of the projection image each time input actuation is performed upon an actuation key, then, even if due to this input actuation the hue of the projection image as seen by the eye of the viewer has changed, it is possible to compensate the hue, thus producing a projection image which can be easily viewed.

Or, it would also be acceptable to arrange for it to be possible to set the frequency of adjustment of the white balance to any of three types of adjustment frequency by input actuation of an actuation key, in the same manner as in the case of adjustment of the focus state or adjustment of the brightness. In other words, if the highest frequency of adjustment has been set, then adjustment of the white balance is performed repeatedly during projection of the projection image; and, on the other hand, if the intermediate frequency of adjustment has been set, then adjustment of the white balance is only performed during the projection of a projection image for the first time; while, if the lowest frequency of adjustment has been set, then it is arranged not to perform adjustment of the white balance of the projected image. By arranging matters in this manner, it is possible to keep the consumption of electrical power down when adjustment of the white balance of the projection image is unnecessary.

Although, in the explanation described above, adjustment of the white balance was explained, by way of example, as an example of adjustment of the hue of the projection image, it would also be acceptable to arrange to apply this technique to the case of adjusting the hue with reference to some color other than white.

(4) Compensation of Trapezoidal Deformation

Finally, the compensation of trapezoidal deformation will be explained. By trapezoidal deformation, is meant deformation in a trapezoidal shape of the projection image, created corresponding to the angle between the projection direction by the projector module 6 and the projection surface. If the projection direction is not straight against the projection surface, then it is known that so called trapezoidal deformation is engendered. This compensation of trapezoidal deformation is performed based upon a photographic image of the projection image which is acquired by photography by the camera module 7, in the same manner as in the case of the various types of adjustment described above.

This portable telephone device with incorporated projector 10 decides whether or not trapezoidal deformation in the projection image is occurring, by detecting the shape of the photographic image outputted from the camera module 7 with the CPU 101. If trapezoidal deformation is occurring, then the liquid crystal drive unit 65 is controlled, and the image displayed upon the liquid crystal panel 62 is distorted in the opposite direction to this trapezoidal deformation, so that the trapezoidal deformation is cancelled. By projecting this image, the trapezoidal deformation is compensated.

With this portable telephone device with incorporated projector 10, when compensating the trapezoidal deformation based upon a photographic image in the above manner, after having superimposed a predetermined drawing for specifying the shape of the projection image (hereinafter termed the "drawing for shape specification") upon the image which has been selected as the subject for projection, this is projected by the projector module 6, and the projection image is photographed by the camera module 7. By doing this, it is possible to compensate the trapezoidal deformation based upon the drawing for shape specification which has been superimposed, whatever the contents of the subject image for projection may be.

FIG. 7 is a figure showing the situation in which a drawing for shape specification has been superimposed upon an image which is a subject for projection. (a) shows the original image which is the subject for projection, while (b) shows an image in which the drawing for shape specification has been superimposed upon this subject image for projection. In the image of (b), a drawing for shape specification formed as a thick frame is superimposed upon the periphery of the subject image for projection. The image which includes this type of drawing for shape specification is projected upon the projection surface by the projector module 6, and this projection image is photographed by the camera module 7. Using the photographic image which has been acquired in this manner, the shape of the projection image is specified based upon the drawing for shape specification 23, and compensation of the trapezoidal deformation is performed. It should be understood that the drawing for shape specification 23 shown here is given by way of example; it goes without saying that it would also be acceptable to employ a drawing of any type, provided that it is one which can specify the shape of the projection image. Or it would also be acceptable to utilize, not a drawing, but a symbol or characters or the like.

It would also be acceptable to perform the superimposition of the drawing for shape specification as explained above for only a predetermined short time period, as in the case of the image for contrast calculation, the image for brightness detection, or the image for hue detection described above. In this case, the projection image should be photographed by the camera module 7 in synchronization with the timing at which the image including the drawing for shape specification is projected.

Furthermore, in the same manner as with the various types of adjustment described above, it would also be acceptable to arrange to perform this compensation of trapezoidal deformation repeatedly at a fixed period, or to arrange to perform it repeatedly each time input actuation is performed to an actuation key of this portable telephone device with incorporated projector 10. When input actuation is performed to an actuation key, sometimes it happen that, due thereto, the position or the orientation of the portable telephone device with incorporated projector 10 changes, so that the angle between the projection direction of the projection image and the projection surface varies, and as a result sometimes the shape of the trapezoidal deformation changes, which is undesirable. Accordingly, if the compensation of trapezoidal deformation is performed each time input actuation to an actuation key is performed, then, even if due to this input actuation the shape of the trapezoidal deformation has undesirably changed, still it is possible to obtain a projection image in which the trapezoidal deformation is compensated, so that it is easy to view.

Or, in the same manner as with the various types of adjustment previously described, it would also be acceptable to arrange for the frequency of the compensation of trapezoidal deformation to be set to any of three types of adjustment frequency by input actuation of an actuation key. In other words, if the highest frequency of compensation has been set, then compensation of the trapezoidal deformation is performed repeatedly during projection of the projection image; and if the intermediate frequency of compensation has been set, then compensation of the trapezoidal deformation is only performed during the projection of a projection image for the first time; while, if the lowest frequency of compensation has been set, then it is arranged not to perform compensation of trapezoidal deformation. By arranging matters in this manner, it is possible to keep the consumption of electrical power down when compensation of the trapezoidal deformation is not required.

In the above explanation, it was arranged to perform the compensation of trapezoidal deformation by superimposing the drawing for shape specification and photographing an image thereof, and by specifying the shape of the projection image based upon this drawing for shape specification. However, it would also be acceptable to arrange to perform the compensation of trapezoidal deformation based upon the folding angle θ which has been detected by the opening and closing angle sensor 112. At this time, it is supposed that the projection direction of the projection image by the projector module 6 is fixed with respect to the display section 2. By doing this, when projection is performed with the bottom surface portion of the actuation section 1 installed upon a desktop or the like, it is possible to compensate the trapezoidal deformation in a simple manner even without performing photography.

Figure 8:
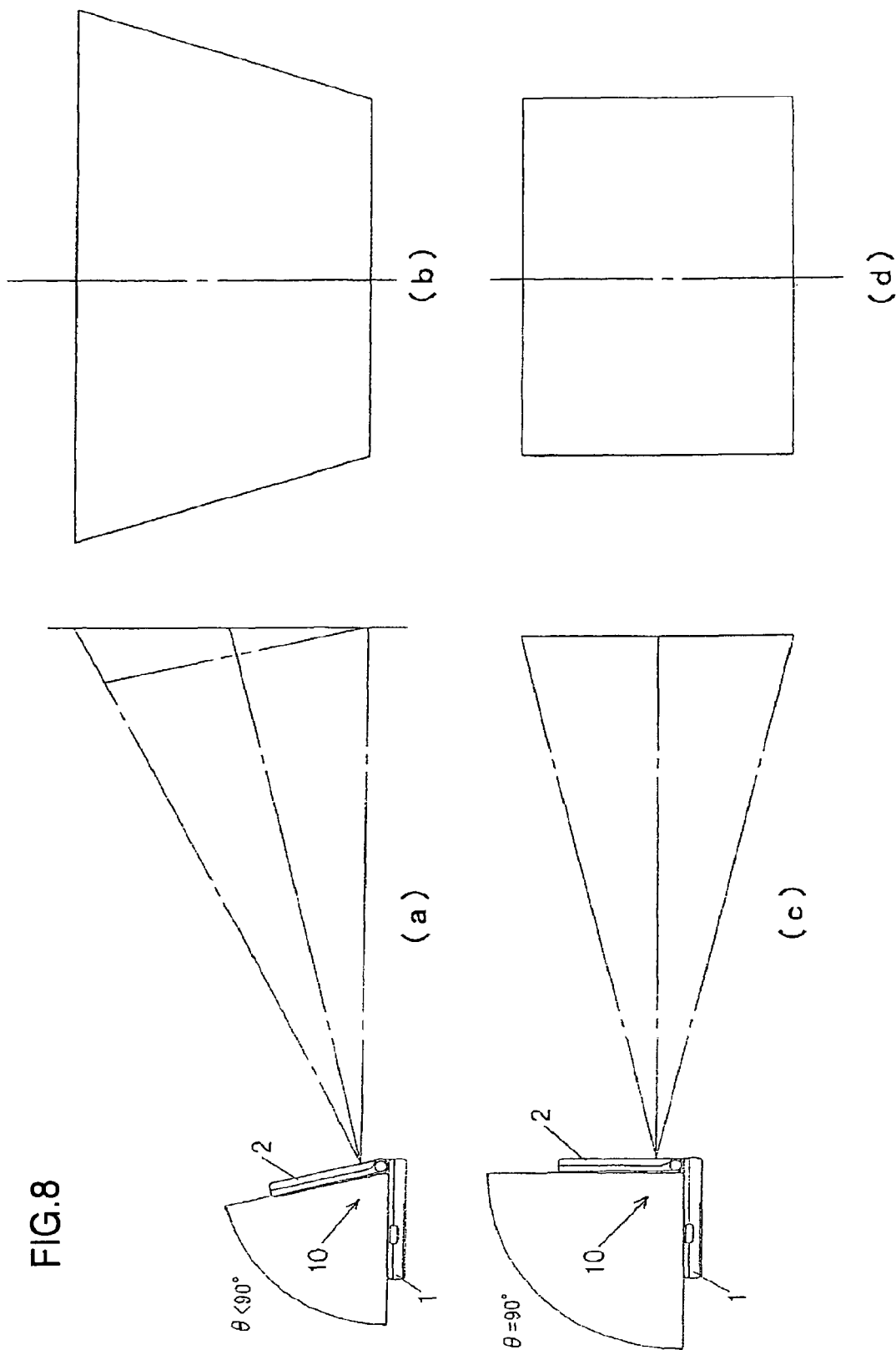
FIG. 8 is a figure showing a relationship between folding angle θ and trapezoidal deformation.

FIG. 8 is a figure showing, when the actuation section 1 is set upon a horizontal surface and the projection is performed upon a vertical projection surface, the relationship between the folding angle θ and the trapezoidal deformation. (a) is a figure showing in side view the situation of the projection when the folding angle θ is smaller than 90°, while (b) is a figure showing the trapezoidal deformation situation during (a) in elevation view. And (c) is a figure showing in side view the situation of the projection when the folding angle θ is equal to 90°, while (d) is a figure showing the trapezoidal deformation situation during (b) in elevation view.

As shown in FIGS. 8(*a*) and (*b*), trapezoidal deformation takes place when the folding angle θ is smaller than 90°. Furthermore, conversely to the above, trapezoidal deformation also takes place when the folding angle θ is greater than 90°. The extent of this trapezoidal deformation (the degree of deformation) changes according to the folding angle θ, and the proportion by which it changes is determinate. Accordingly, it is possible to compensate such trapezoidal deformation, by setting in advance the degree of distortion when distorting the image displayed upon the liquid crystal panel 62, in order to cancel the trapezoidal deformation, according to the value of the folding angle θ. It should be understood that, as shown in FIGS. 8(*c*) and (*d*), compensation of trapezoidal deformation is not necessary when θ=90°, since no trapezoidal deformation occurs.

Or, with this portable telephone device with incorporated projector 10, it would also be acceptable to arrange to make the central transverse shaft of the display section 2 as a rotation shaft, to provide a construction in which the display section 2 can rotate around this rotation shaft as a center, to detect this rotational angle with respect to a predetermined reference position, and to perform the compensation of trapezoidal deformation based upon the rotational angle φ which is detected. It should be understood that, in this case as well, it is supposed that the projection direction of the image projected by the projector module 6 is fixed with respect to the display section 2.

FIG. 9 is a figure showing, when the actuation section 1 is set upon a horizontal surface and the projection is performed upon a vertical projection surface, the relationship between the rotational angle φ of the display section 2 and the trapezoidal deformation. (a) is a figure showing in plan view the situation when performing projection with the rotational angle φ being smaller than 90°, while (b) is a figure showing, in elevation view, the situation of trapezoidal deformation at this time. Moreover, (c) is a figure showing in plan view the situation when performing projection with the rotational angle φ=90°, while (d) is a figure showing, in elevation view, the situation of trapezoidal deformation during (b). It should be understood that the reference position for the rotational angle φ in FIG. 9 is taken as being the center of the transverse shaft of the actuation section 1, and that it is assumed that the folding angle θ is 90°. When the rotational angle φ is 90°, the rear surface of the display section 2 is upright.

As shown in FIGS. 9(*a*) and (*b*), trapezoidal deformation takes place when the rotational angle φ is smaller than 90°. Furthermore, conversely to the above, trapezoidal deformation also takes place when the rotational angle φ is greater than 90°. The extent of this trapezoidal deformation (the degree of deformation) changes according to the rotational angle φ, and the proportion by which it changes is determinate. Accordingly, it is possible to compensate such trapezoidal deformation, by setting in advance the degree of distortion when distorting the image displayed upon the liquid crystal panel 62 in order to cancel the trapezoidal deformation, according to the value of the rotational angle φ, in the same manner as in the case of the folding angle θ. It should be understood that, as shown in FIGS. 9(*c*) and (*d*), compensation of trapezoidal deformation is not necessary when φ=90°, since no trapezoidal deformation occurs.

Furthermore, it would also be acceptable to arrange to employ the above described compensation of trapezoidal deformation based upon the folding angle θ, and the above described compensation of trapezoidal deformation based upon the rotational angle φ, in combination.

As has been explained above, calibration operation is performed by performing the operations of adjustment of the focus state, adjustment of the brightness, adjustment of the white balance, and compensation of the trapezoidal deformation. It should be understood that it is not necessary for all of these operations to be performed; it would also be acceptable to arrange for only selected ones of these operations to be executed.

Next, the method for adjusting the focus of the photographic image made by the camera module 7 will be explained. A so called contrast detection method is used for this adjustment of the focus of the photographic image. In concrete terms, photographic images are acquired while varying the focal point position of the photographic lens 71 in various ways, and the contrast amount of each of these photographic images is calculated. And the contrast amounts of these various photographic images are compared by the CPU 101, which then outputs a control signal to the camera control CPU 74 so as to drive the focal point position of the photographic lens 71 to bring it to the position at which that photographic image whose contrast amount is maximum was acquired. This type of adjustment of the focus of the photographic image is necessary for a photographic image of the projection image to be photographed appropriately, in order to perform the calibration operation.

It would be acceptable to perform this adjustment of the focus of the photographic image at the same time as the adjustment of the focus state of the projection image executed by the projector module 6, or alternatively it would also be acceptable for them to be performed separately. If these focusing operations are performed simultaneously, then the control method which is employed is a so-called same focal point shifting method; while, if they are performed separately, then the control method which is employed is a so-called camera fixed method. These control methods will now be explained in the following, in that order.

The Same Focal Point Shifting Method

In this control method, the photographic focal point position of the camera module 7, in other words the focal point position of the photographic lens 71 with respect to the photographic image, and the projection focal point position of the projector module 6, in other words the focal point position of the projection lens 61 with respect to the projection image, are changed while being maintained in the same positional relationship. Here, by the photographic focal point position and the projection focal point position being in the same positional relationship, is meant that the distances of these two focal point positions with respect to the portable telephone device with incorporated projector 10 are almost equal. And, projection images are generated by the projector module 6 at a plurality of different projection focal point positions, and photographic images of this plurality of projection images are respectively acquired by the camera module 7 at a plurality of photographic focal point positions which are stored in the same positional relationship with this plurality of projection focal point positions. The respective contrast amounts are calculated for this plurality of projection images which have been acquired in this manner, and then the photographic focal point position and the projection focal point position are adjusted so as to match their positions when the contrast amount attained its maximum. By doing this, adjustment of the focus of the photographic image and adjustment of the focus state of the projection image are performed simultaneously. Moreover, at this time, based upon the plurality of photographic images which have been acquired, it would also be acceptable also to execute other calibration operations other than this adjustment of the focus state of the projection image.

Figure 10:
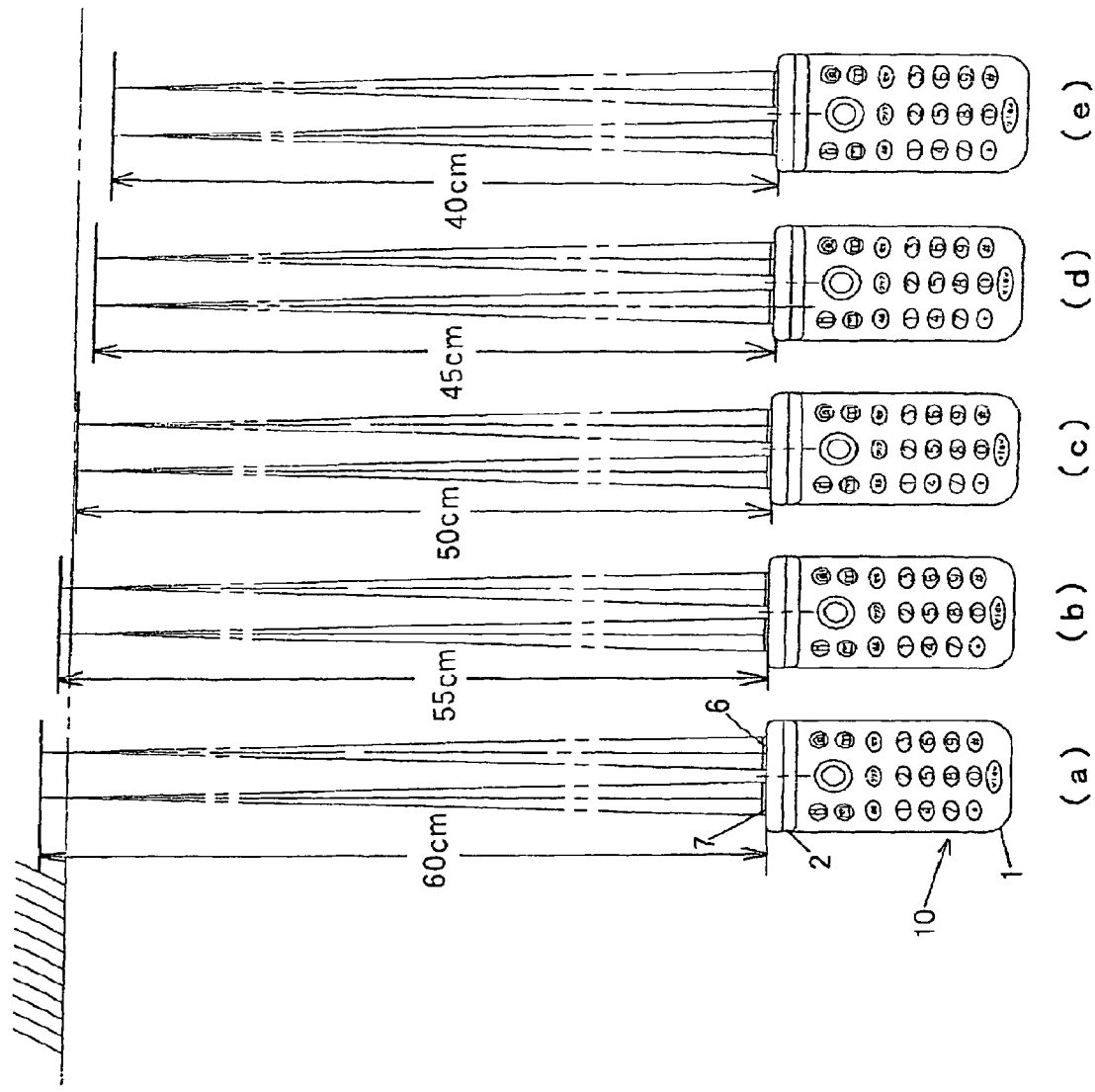
FIG. 10 is a figure showing a situation in which adjustment of the focus of a photographic image and adjustment of the focus state of a projection image are performed simultaneously using the same focal point shifting method.

FIG. 10 is a figure showing the situation in which adjustment of the focus of the photographic image and adjustment of the focus of the projection image are performed simultaneously using this same focal point shifting method explained above. In FIGS. 10(*a*) through (*e*), the portable telephone device with incorporated projector 10 is installed at a position about 50 cm from the projection surface. It should be understood that it is supposed that, for this projector module 6, about 50 cm is the optimum projection distance.

First, as in (a), the photographic focal point position of the camera module 7 and the projection focal point position of the projector module 6 are both set to a position 60 cm away from the portable telephone device with incorporated projector 10. In this state, the projection image which is generated by the projector module 6 is photographed by the camera module 7, and the contrast amount in this photographic image is calculated. Next, as in (b), the photographic focal point position of the camera module 7 and the projection focal point position of the projector module 6 are both set to a position 55 cm away from the portable telephone device with incorporated projector 10, and the contrast amount in the photographic image of this projection image, is calculated.

Thereafter, as in (c) through (e), the photographic focal point position of the camera module 7 and the projection focal point position of the projector module 6 are both set to, in order, positions 50 cm, 45 cm, and 40 cm away from the portable telephone device with incorporated projector 10, and the contrast amounts in the photographic images of the projection images in these positions are calculated. And the photographic focal point position of the camera module 7 and the projection focal point position of the projector module 6 are adjusted to match their positions when the maximum contrast amount was obtained. By doing this, along with performing the adjustment of the focus of the photographic image, the adjustment of the focus state of the projection image is also performed.

As has been explained above, when this same focal point shifting method is used, the photographic focal point position of the camera module 7 and the projection focal point position of the projector module 6 are kept at almost the same distance from the portable telephone device with incorporated projector 10. Now, the closer the projection focal point position is to the projection surface, the higher is the contrast of the projection image which is generated, and the closer is the photographic focal point position to the projection surface, the higher is the contrast of the photographic image of the projection image which can be acquired. Accordingly, by using this same focal point shifting method, it is possible to take the difference between the contrast amounts which are calculated in the focused state and in the non-focused state to be great, so that it is possible to adjust both the photographic focal point position and the projection focal point position together in an accurate manner. Due to this, it is possible to ensure that the projection image can be photographed appropriately with the camera module 7. It should be understood that, if a yet higher level of accuracy is considered to be required, then, after having temporarily set the photographic focal point position and the projection focal point position which have been obtained by a method like the above, the same processing may be repeated while varying the photographic focal point position and the projection focal point position in more finely divided steps of focal point position around this position as a center.

The Camera Fixed Method

In this control method, only the projection focal point position of the projector module 6 is varied, in a state in which the photographic focal point position of the camera module 7 is kept fixed. And photographic images are generated of projection images at a plurality of different projection focal point positions, with this plurality of photographic images of projection images being acquired with a single fixed photographic focal point position. And the contrast amount is calculated for each of this plurality of photographic images of projection images which have been acquired in this manner, and the projection focal point position of the projector module 6 is adjusted to match its position when the contrast amount attained its maximum.

After having adjusted the projection focal point position in this manner, if the above described plurality of photographic images of projection images which have been acquired by the camera module 7 for a single photographic focal point position satisfy a predetermined condition—in concrete terms, if the maximum contrast amount which has been calculated for this plurality of photographic images of projection images is smaller than a predetermined threshold value—then, based upon this plurality of photographic images of projection images, the photographic focal point position is adjusted so as to match the same position as the projection focal point position, using the maximum contrast amount which has been calculated. Thereafter, in this photographic focal point position after adjustment for a second time, only the projection focal point position is varied, and, in the same manner as described above, a plurality of projection images are generated by the projector module 6, and acquisition of photographic images of this plurality of projection images is performed by the camera module 7 for a second time. The contrast amounts for the photographic images which have been acquired in this manner are calculated, and the projection focal point position is adjusted to match the position of the maximum contrast amount. By repeating this type of processing, the adjustment of the focus of the photographic image and the adjustment of the focus state of the projection image are performed separately. Furthermore, at this time, based upon the plurality of photographic images which have been acquired, it would also be acceptable also to execute other calibration operations other than this adjustment of the focus state of the projection image.

Figure 11:
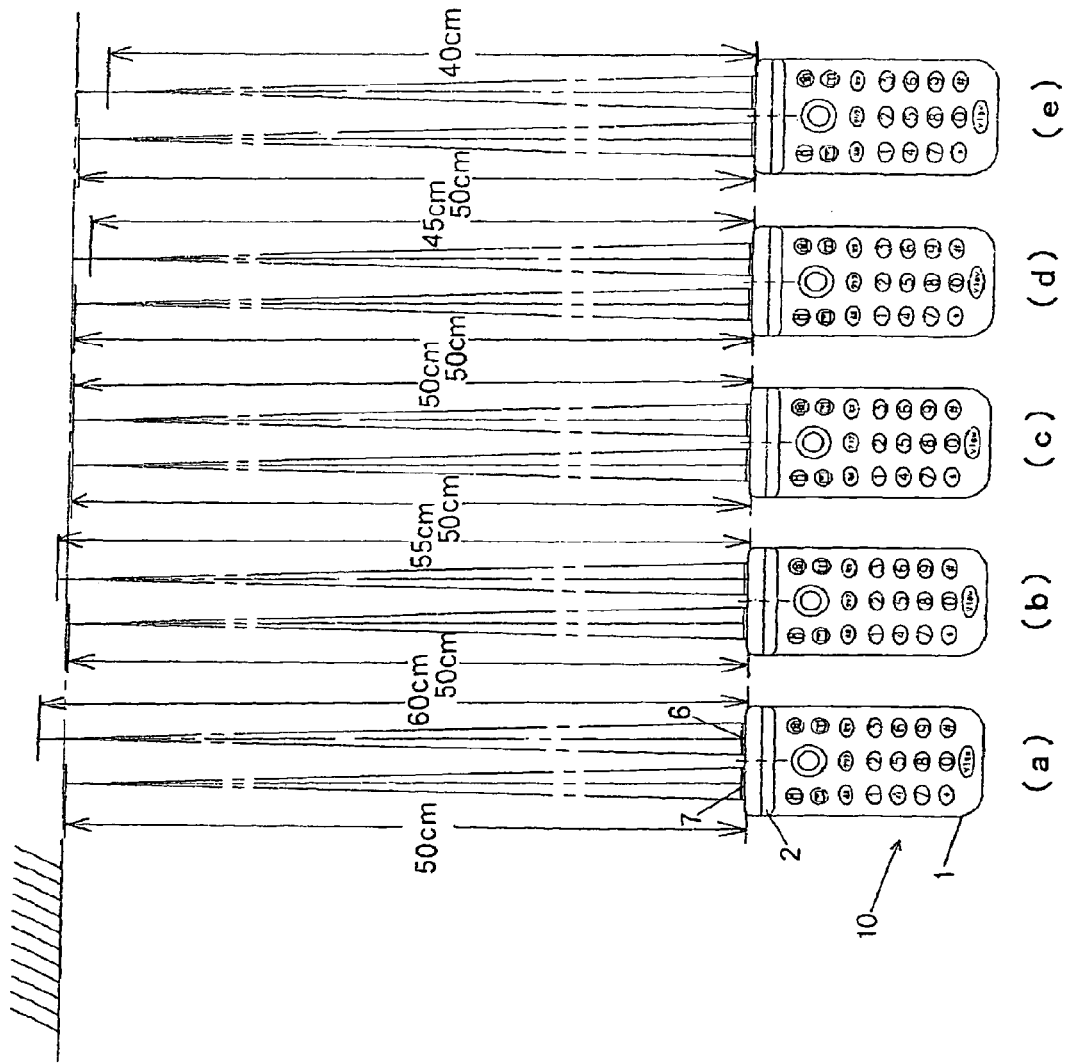
FIG. 11 is a figure showing a situation in which adjustment of the focus of a photographic image and adjustment of the focus state of a projection image are performed separately using a camera fixed method.

FIG. 11 is a figure showing the situation in which adjustment of the focus of the photographic image and adjustment of the focus state of the projection image are performed separately using the camera fixed method explained above. In FIGS. 11(a) through (e), just as in FIG. 10, the portable telephone device with incorporated projector 10 is installed at a position about 50 cm from the projection surface; it is supposed that, for this projector module 6, the optimum projection distance is about 50 cm.

First, as in (a), in the state with the photographic focal point position of the camera module 7 being set to and fixed at a position 50 cm away from the portable telephone device with incorporated projector 10, the projection focal point position of the projector module 6 is set to at a position 60 cm away from the portable telephone device with incorporated projector 10. In this state, the projection image which is generated by the projector module 6 is photographed by the camera module 7, and the contrast amount in this photographic image is calculated. Next, as in (b), with the photographic focal point position fixed just as it is in the same position, the projection focal point position is set to a position 55 cm away from the portable telephone device with incorporated projector 10, and the contrast amount in the photographic image of this projection image is calculated.

Thereafter, as in (c) through (e), with the photographic focal point position of the camera module 7 kept fixed just as it is in a position 50 cm away from the portable telephone device with incorporated projector 10, the projection focal point position of the projector module 6 only is set to, in order, positions 50 cm, 45 cm, and 40 cm away from the portable telephone device with incorporated projector 10, and the contrast amounts in the photographic images of the projection images in these positions are calculated. And the projection focal point position of the projector module 6 is adjusted to match its position when the maximum contrast amount was obtained, and a decision is made as to whether or not the value of this maximum contrast amount is greater than or equal to a predetermined threshold value which is decided in advance. If it is greater than or equal to the threshold value, then the adjustment of the focus state of the projection image is terminated. It should be understood that it would also be acceptable further to arrange to subsequently perform focus adjustment of the photographic image of the camera module 7.

If the maximum contrast amount is smaller than the threshold value, then, after adjusting the photographic focal point position to match the position at which this maximum contrast amount was obtained, then the projection focal point position is changed as explained by (a) through (e) in order for a second time, and photographic images of these projection images are obtained by the camera module 7. The contrast amounts of the photographic images thus acquired are calculated, and, after having adjusted the projection focal point position to match the position at which the maximum contrast amount was obtained, then this maximum contrast amount and the threshold value are compared together again. By repeating this type of processing, the adjustment of the focus of the photographic image and the adjustment of the focus state of the projection image are performed separately.

If the camera fixed method as explained above is employed, then, since the adjustment of the focus of the image photographed by the camera module 7 and the adjustment of the focus state of the image projected by the projector module 6 are executed separately, therefore it is possible to perform these two adjustments by a more simple processing procedure than in the case of the same focal point shifting method. Accordingly, it is possible to enable the camera module 7 to, photograph the projection image in an appropriate manner, even if a CPU whose processing capability is low is used, or the like.

It should be understood that, with the camera fixed method as explained above, it would also be acceptable to perform the adjustment of the focus state of the projection image once only. In other words, it would be acceptable to arrange to finally determine the projection focal point position based upon a plurality of photographic images acquired in a photographic focal point position which was initially fixed, and not to repeat the processing a second time. According to the degree of blurring of the projection image and the depth of field of the image to be photographed, it is possible to adjust the focus state in an appropriate manner even in this manner. Furthermore, in this case, it is desirable to keep the photographic focal point position of the camera module 7 fixed by maintaining the pan focus state in which the focus of the photographic image which is acquired is set from close to infinity. If this is done, it is not necessary to repeat the adjustment processing for the projection focal point position a plurality of times, and it is possible to adjust the focus state of the projection image within a short time period, and thus to reach a state in which it is possible to photograph the projection image in an appropriate manner. It should be understood that this type of method for adjustment of the focus state of the projection image may also be applied in a case in which the camera module 7 is a single focal point camera which is not endowed with any focal point adjustment function.

Next, the white balance adjustment method for the image photographed by the camera module 7 will be explained. With an electronic camera which photographs an object to be photographed and acquires a photographic image thereof, normally, white balance adjustment is performed in order to match the hues of the photographic images which have been acquired by photographing various kinds of scenes, to the eye with which a human being views those images. In other words, change of hue of an image of an object to be photographed which originates due to the ambient light distribution situation during photography is suppressed, and the color information values of the photographic image are converted to different values based upon color conversion rules or the like which are stored in advance, so that the photographic image which is obtained from this image of the object to be photographed is expressed in its natural hues. Hues appear in the photographic image according to these color information values after conversion.

With the portable telephone device with incorporated projector 10 of this embodiment, as previously described, the photographic image which is acquired by the camera module 7 is outputted to the CPU 101 as image data, and, based upon this image data, the hue of the photographic image is adjusted by executing conversion processing of the color information values described above by the CPU 101. White balance adjustment of the photographic image is performed in this manner. It should be understood that the details of the color conversion ruses which are used at this time may be changed over by the user setting a type for the photographic scene.

Furthermore, during photography of a projection image generated by the projector module 6 with the camera module 7, the type of white balance adjustment of the photographic image explained above is executed automatically. In other words, when a projection image is generated using the projector module 6, the photographic image is automatically acquired by the camera module 7, and white balance adjustment is performed for this photographic image. In this white balance adjustment of the photographic image during projection, irrespective of the state to which the type of the photographic scene is set, the hue of the photographic image which has been acquired by the camera module 7 is adjusted based upon predetermined color conversion rules which are determined upon in advance for projection image photography. It should be understood that these predetermined color conversion rules mentioned here will be explained hereinafter.

When performing white balance adjustment of the photographic image during projection by doing the above, first the LED light source 63 of the projector module 6 outputs light which has been adjusted to a predetermined hue which is set in advance. The projection image at this time is photographed by the camera module 7, and, after white balance adjustment during projection of the photographic image has been performed, calibration operations such as those previously described are executed based upon this photographic image after white balance adjustment. By performing the white balance adjustment of the projection image already explained during the calibration operation, the light emission color of the LED light source 53 is changed to the above described predetermined hue, so that the hue of the projection image is adjusted.

Here, there are individual differences in hue characteristics during light emission between different LED light sources 63 for the projector module 6, and, even if as described above light which has been output to a predetermined hue which is set in advance is outputted, the actual hue of this output light will differ minutely between individual cases. Furthermore, if a plurality of different types of this portable telephone device with incorporated projector 10 exist with different specifications, then sometimes the LED light source 63 which is used for each such device has a different specification. Differences occur in the hue of the output light in this type of case as well, since the hue characteristics during light emission are different.

Due to this, with the portable telephone device with incorporated projector 10 of this embodiment, white balance adjustment of the photographic image during projection is executed based upon predetermined color conversion rules which are determined upon in advance according to the hue characteristics of the LED light source 63. In these predetermined color conversion rules, settings are made so that the differences in hue characteristic for different LED light sources 63 as explained in the above are compensated. In other words, the hue characteristics of the LED light sources 63 are measured in advance for each individual or type of device, and, based upon the results of this measurement, color conversion rules which eliminate differences in the hue of the outputted light are stored in the CPU 101 of the portable telephone device with incorporated projector 10 during manufacture. By using this type of color conversion rules, it is possible to compensate differences of the hue characteristic between different LED light sources 63, and it is possible to ensure that the projection image can be photographed by the camera module 7 in an appropriate manner.

It should be understood that it would also be acceptable to arrange for it to be possible to set the above type of color conversion rules after the manufacture of the portable telephone device with incorporated projector 10. For example, before projecting an image using the projector module 6, output light itself, in other words a colorless transparent image, may be projected from the LED light source 63 upon a white colored projection surface in a predetermined hue described above, and this projection image may be photographed with the camera module 7. In this manner, based upon the photographic image which has been acquired, differences of the hue characteristic of the LED light source 63 with respect to a reference characteristic may be detected, and, according to the results of this detection, color conversion rules may be set to be used in white balance adjustment of photographic images during projection.

According to the first embodiment explained above, the following beneficial operational effects are obtained.

(1) It is arranged for the calibration operation by the projector module 6 to be executed repeatedly during the projection of the projection image by the projector module 6, based upon the photographic image of the projection image which has been acquired by photography by the camera module 7. In concrete terms, it is arranged for the adjustment of the focus state of the projection image, the adjustment of the brightness of the projection image, the adjustment of the hue of the projection image, and the compensation of trapezoidal deformation of the projection image, to be executed repeatedly during projection of the projection image. Since this is done, it is possible to adjust the picture quality of the projection image in an appropriate manner, even if the projection image has wobbled during projection due to the orientation of the hand which holds the portable telephone device with incorporated projector 10 having changed, or the like.

(2) By repeatedly executing the calibration operations, in other words the adjustment of the focus state of the projection image, the adjustment of the brightness of the projection image, the adjustment of the hue of the projection image, and the compensation of trapezoidal deformation of the projection image, upon a fixed cycle, it is possible always to keep the appearance of the projection image adjusted during projection.

(3) It is also possible to execute the calibration operations, in other words the adjustment of the focus state of the projection image, the adjustment of the brightness of the projection image, the adjustment of the hue of the projection image, and the compensation of trapezoidal deformation of the projection image, repeatedly each time actuation input to an actuation key is performed. If this is done, then, even if due to the actuation input to an actuation key the position or the orientation of the portable telephone device with incorporated projector 10 changes, and the projection image wobbles undesirably, still it is possible to compensate for this, and accordingly it is possible to obtain a projection image which is easy to view.

(4) Among these calibration operations, it was arranged to perform the adjustment of the focus state of the projection image, the adjustment of the brightness of the projection image, and the adjustment of the hue of the projection image, based upon patterns of predetermined shapes included in the photographic image of the projection image. In concrete terms, it was arranged to adjust the focus state of the projection image based upon the image for contrast calculation including a pattern of a predetermined shape, to adjust the brightness of the projection image based upon the image for brightness detection including a pattern of a predetermined shape, and to adjust the hue of the projection image based upon the image for hue detection including a pattern of a predetermined shape. Since this is done, it is possible to adjust the focus state, the brightness, and the hue of the projection image during projection.

(5) Furthermore, among these calibration operations, it was arranged to perform compensation of trapezoidal deformation of the projection image, based upon a predetermined drawing or symbol for specifying the shape of the projection image, included in the photographic image of the projection image. Since this is done, it is possible to compensate the trapezoidal deformation of the projection image even during projection.

(6) By arranging to project the image including the pattern of a predetermined shape, or the image including the predetermined drawing or symbol, for only a predetermined short time period, and by photographing the projection image as an object to be photographed in synchronization with the projection timing of that image, it is possible to make it difficult to notice this pattern of a predetermined shape or drawing or symbol, from the point of view of a person viewing the projection image.

(7) It is also possible to set the frequency of the calibration operation, in other words of the adjustment of the focus state of the projection image, of the adjustment of the brightness of the projection image, of the adjustment of the hue of the projection image, and of the compensation of trapezoidal deformation of the projection image. And it may made possible to arrange to set this frequency to one of three types of frequency, and to execute these calibration operations repeatedly during projection of the projection image if the highest frequency is set, to execute these calibration operations only once during projection of the projection image if the intermediate frequency is set, and not to execute these calibration operations if the lowest frequency is set. If this is done, then it is possible to keep down the consumption of electrical power if the type of calibration operation described above is not required.

(8) When a still image is being projected, it is also possible to adjust the focus state of the projection image based upon a photographic image which has been acquired by photographing that projection image. It is also possible to adjust the focus state of the projection image during projection by doing this.

(9) Furthermore, in the case described above, when a moving image is being projected, it is also possible to project an image which includes an image for contrast calculation having a pattern of a predetermined shape. If this is done, then it is possible to adjust the focus state of the projection image during projection, even during the projection of a moving image.

(10) Since it is arranged to adjust the brightness of the projection image by changing the light emission amount from the LED light source 63, accordingly it is possible to adjust the brightness of the projection image by a simple process. Furthermore it is also possible, if at this time the image is darker than a predetermined reference value, to adjust the brightness of the projection image by decreasing the light emission amount from the LED light source 63, and, if it is brighter than a predetermined reference value, to adjust the brightness of the projection image by varying the actual brightness of the image which is displayed upon the liquid crystal panel 62. If this is done, then it is possible to reduce the amount of consumption of electrical power and the amount of heat generated, by keeping down the amount of light emission.

(11) Since it is possible to adjust the hue of the projection image by changing the amount of light emitted from the LED light source 63 for each of its R, G, and B light emission colors, accordingly it is possible to adjust the hue of the projection image by a simple process.

(12) It may be arranged to detect the folding angle of the actuation section 1 and the display section 2, and to compensate the trapezoidal deformation based upon this detected folding angle θ. Or, it may be arranged to detect the rotational angle φ of the display section 2, and to compensate the trapezoidal deformation based upon this detected rotational angle φ. It is possible to compensate the trapezoidal deformation with a simple control sequence by doing this, since it becomes unnecessary to perform photography of the projection image using the camera module 6.

(13) If the same focal point shifting method is used for adjusting the focus of the photographic image, then respective projection images are created by the projector module 6 at a plurality of different projection focal point positions, and photographic images of this plurality of projection images are acquired by the camera module 7. At this time, it is arranged to acquire these photographic images of this plurality of projection images at a respective plurality of photographic focal point positions at which the distances with respect to the portable telephone device with incorporated projector 10 is respectively almost equal to those at the plurality of projection focal point positions at which the projection images were created. Since this is done, it is possible to ensure that the projection images can be photographed in an appropriate manner with the camera module 7.

(14) If the camera fixed method is used for adjusting the focus of the photographic image, then projection images are created by the projector module 6 at a plurality of different projection focal point positions, and photographic images of this plurality of projection images are acquired by the camera module 7. At this time, it is arranged for this plurality of photographic images of the projection images all to be acquired at a single fixed photographic focal point position. In this manner as well, it is possible to ensure that the projection images can be photographed in an appropriate manner with the camera module 7.

(15) If the camera fixed method is used, then, furthermore, if the plurality of photographic images of the projection images which have been acquired at the single photographic focal point position satisfy some predetermined condition, then, after having adjusted the photographic focal point position based upon this plurality of photographic images of these projection images, a plurality of projection images are generated by the projector module 6, and it is arranged, for a second time, to perform acquisition by the camera module 7 of a plurality of photographic images of these projection images at this photographic focal point position after adjustment. Since this is done, it is possible to enable photography of the projection images at the photographic focal point position after adjustment in an appropriate manner, even if the photographic focal point position which was initially fixed was not appropriate.

(16) Furthermore, if the camera fixed method is used, then, if it is arranged to fix the photographic focal point position by the camera module 7 so that it is in a pan focus state in which the focus of the photographic image which is acquired is matched from close up to infinity, and to acquire a plurality of photographic images of the projection images at this photographic focal point position, then it is not necessary to repeat the adjustment processing for the projection focal point position a plurality of times, and it is possible to make it possible to perform photography of the projection images in an appropriate manner, in a short time period.

(17) In the white balance adjustment of the photographic image during projection, it was arranged, while photographing the projection image with the camera module 7, to adjust the hue of the acquired photographic image based upon predetermined color conversion rules which are determined according to the hue characteristics of the LED light source 63 in advance. Since this is done, it is possible to enable photography of the projection image with the camera module 7 in an appropriate manner, even while performing white balance adjustment of the photographic image, in other words adjustment of the hue of the photographic image.

Second Embodiment

A second embodiment of the present invention will now be explained. In this embodiment, a zoom function is provided to the camera module 7, and during photography, upon actuation by the user, the camera can be shifted to any desired zoom position. Due to this, it is possible for the user to perform photography while magnifying or shrinking an object to be photographed. It should be understood that the external appearance and structure of this embodiment are the same as those of the first embodiment, and accordingly explanation thereof will here be omitted.

In this embodiment, the photographic lens 71 of the camera module 7 is a zoom lens which is capable of zooming, and its zoom position is controlled by being driven by a lens drive unit 73, based upon control by the camera control CPU 74. During photography of a projection image by the camera module 7, the camera control CPU 74 controls the zoom position of the photographic lens 71 so that it reaches a predetermined zoom position which is set in advance. In other words, when generating a projection image using the projector module 6, the photographic lens 71 is automatically controlled to the predetermined zoom position by the camera module 7, for acquisition of the photographic image. The predetermined zoom position at this time is set that at least the photographic range of the camera module 7 includes the projection range by the projector module 6 of the projection images. It should be understood that the projection range of the projection images fluctuates according to the distance between the portable telephone device with incorporated projector 10 and the projection surface. Accordingly, it is desirable to set the predetermined zoom position in consideration of this fluctuation amount, so that the photographic range is the larger thereof.

The camera module 7 photographs the projection image which is generated by the projector module 6 with the photographic range when the above described predetermined zoom position is set. Based upon this photographic image, the calibration operation previously described is performed by the CPU 101 and the projector module 6, and the picture quality of the projection image is adjusted.

Figure 12:
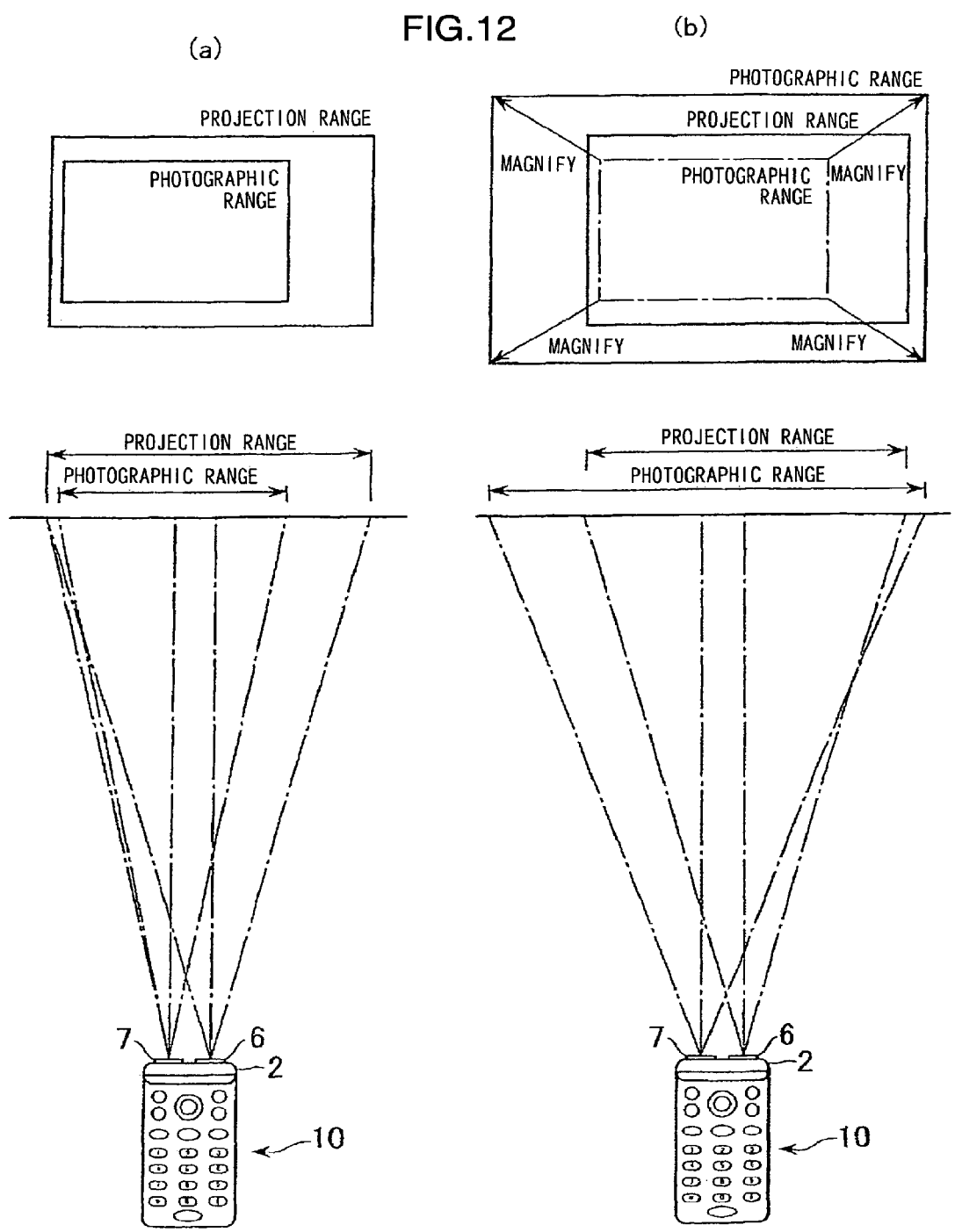
FIG. 12 is a figure showing a situation when controlling zoom position so that the photographic range includes the projection range.

FIG. 12 is a figure showing the situation when the zoom position of the camera module 7 is controlled so that the photographic range includes the projection range. The plan view of (a) and the elevation view of (b) are figures showing the relationship between the photographic range and the projection range before control of the zoom position is performed. The photographic range by the camera module 7 at this time is narrower than the projection range by the projector module 6. Since it is not possible to photograph the entire projection image in this state, accordingly during projection the zoom position is controlled so as to magnify the photographic range.

The plan view of (c) and the elevation view of (d) are figures showing the relationship between the photographic range and the projection range after control to the predetermined zoom position has been performed. At this time, the photographic range of the camera module 7 is magnified by pulling back the zoom position more than in the state of (a) and (b), so that the photographic range is magnified so as to include the projection range by the projector module 6. The zoom position is controlled in this manner. It should be understood that, if the zoom position is to the side at which the photographic range is more magnified than the previously described predetermined zoom position, then it would be acceptable to perform control so as to bring about the predetermined zoom position, in the same manner as described above; or, alternatively, it would also be acceptable not to change the zoom position, but to leave it just as it is.

According to the second embodiment explained above, when the projection image is being photographed by the camera module 7, it is arranged to control the zoom position of the camera module 7 by the camera control CPU 74 to the predetermined zoom position which is set in advance, so that the photographic range of the camera module 7 at least includes the projection range of the projection image. Since this is done, it is possible to ensure that it is possible to perform photography of the projection image in an acceptable manner, even if a zoom mechanism is provided to the camera module 7.

It should be understood that, in the above described first and second embodiments, it would also be acceptable to arrange for the CPU 101 to store various types of setting states of the camera module 7 before photographing the projection image with the camera module 7, and to return these various types of setting state to these stored states, after the generation of the projection image by the projector module 6 has stopped, or after the execution of the calibration operation has stopped. Here, in the first embodiment, the state of the photographic focal point position or the state of the color conversion rules used during white balance adjustment of the photographic image corresponds to these various types of setting state; while, in the second embodiment, the state of the zoom position corresponds thereto. It should be understood that it goes without saying that, in this case, the color conversion rules which are used during white balance adjustment of the photographic image are different, when the projection image is being photographed by the camera module 7, and when it is not thus being photographed.

Third Embodiment

Figure 13:
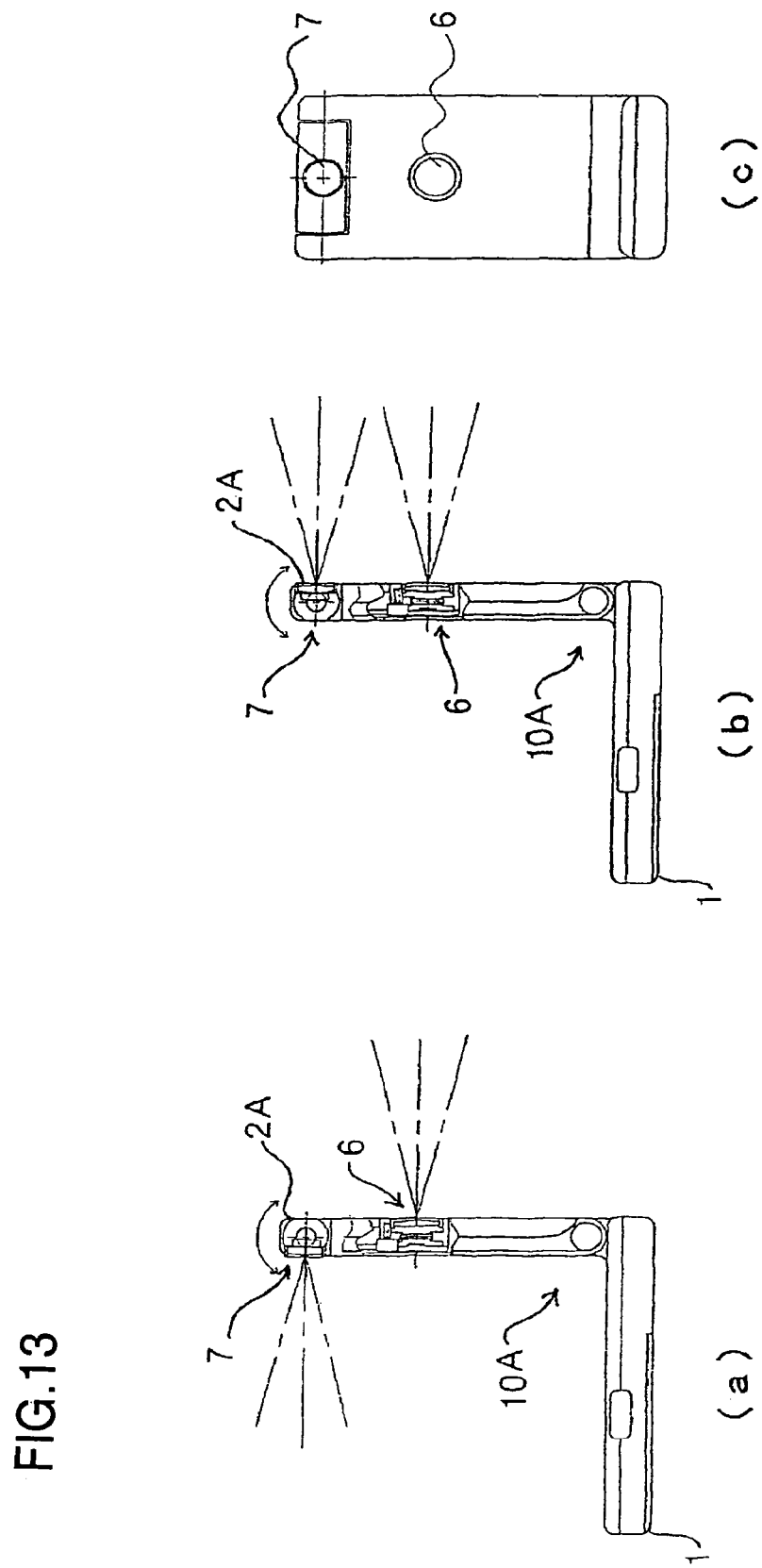
FIG. 13 is a figure showing the external appearance of a portable telephone device with incorporated projector according to another embodiment of the present invention.

A third embodiment of the present invention will now be explained. FIG. 13 is a figure showing the external appearance of a portable telephone device with incorporated projector 10A according to this embodiment. (a) and (b) show a side view thereof, while (c) shows a rear view. In this portable telephone device with incorporated projector 10A, the actuation section 1 and the display section 2A have the same structures as in the first embodiment. And a projector module 6 and a camera module 7 are provided to the display section 2A, disposed in positions shown in the figure, while the sub-liquid crystal display device 5 of FIG. 1 is not incorporated. Apart from these points, the display section 2 is the same as in the first embodiment.

The camera module 7 is provided in a camera fitting mechanism portion 2B of the display section 2A. This camera fitting mechanism portion 2B comprises a rotatable mechanism for changing the photographic direction of the camera module 7. Due to this, sometimes the photographic direction of the camera module 7 and the projection direction of the projector module 6 are the same direction, as shown in (b), and sometimes they are not the same direction, as shown in (a). When they are not the same, as shown in (a), then, when an image is being projected by the projector module 6, since it is not possible to photograph this projection image with the camera module 7, accordingly calibration operations as previously described are not executed.

Due to this, in this embodiment, it is arranged to provide a rotational angle detection unit (not shown in the figures) to the display section 2A for detecting the rotational angle of the camera fitting mechanism 2B, and the photographic direction of the camera module 7 is decided upon according to this rotational angle. And a decision is made by the CPU 101 as to whether or not the photographic direction of the camera module 7 and the projection direction of the projector module 6 are the same, and the CPU 101 permits the operation of the projector module 6 only if it has been decided that they are the same.

If the result of the decision described above is that the photographic direction and the projection direction are not, the same direction, then, along with the operation of the projector module 6 being prohibited by the CPU 101, also a warning is issued in order to urge the user to change the photographic direction of the camera module 7. This warning may be displayed as a warning message upon the main liquid crystal display device 4, or may be outputted as a warning noise from the speaker 111. It should be understood that it would also be acceptable to arrange only to execute one or the other of the above described control to permit or prevent the operation of the projector module 6, and the output of a warning noise.

According to the third embodiment explained above, the following beneficial operational effects are obtained.

(1) Since it is arranged to decide whether or not the projection direction of the projector module 6 and the photographic direction of the camera module 7 are the same direction, and to issue a warning if it has been decided that they are not the same direction, accordingly it is possible to make it possible to perform photography of the projection image in an appropriate manner, even in this case in which the photographic direction of the camera module 7 is variable.

(2) Furthermore, it is arranged to permit the operation of the projector module 6 only if it has been decided that the projection direction of the projector module 6 and the photographic direction of the camera module 7 are the same direction. By doing this, also, it is possible to make it possible to perform photography of the projection image in an appropriate manner, even in this case in which the photographic direction of the camera module 7 is variable.

It should be understood that, in the various embodiments described above, portable telephone devices with incorporated projectors have been explained as examples of the provision of a projector function to a portable telephone device. However any kind of compact portable type electronic device which is endowed with a projector function and a camera function would also be acceptable; provided that the projector device is capable of performing operations like those described above, it is not limited to being installed in a portable telephone device. Or, it would also be acceptable to install a projector function upon an electronic camera such as a digital still camera or the like, and to perform operations like those described above thereupon.

Although the details of various embodiments have been explained in the above description, the present invention is not to be considered as being limited by the contents thereof. Other modes which are considered to lie within the range of the technical concept of the present invention are also included within its scope.

The contents of the disclosure of the following patent applications, upon which priority is based, are hereby incorporated by reference:

Japanese Patent Application No. 2004-273417 (filed on 21 Sep. 2004);

Japanese Patent Application No. 2004-273427 (filed on 21 Sep. 2004);

Japanese Patent Application No. 2004-273428 (filed on 21 Sep. 2004);

Japanese Patent Application No. 2004-273429 (filed on 21 Sep. 2004);

Japanese Patent Application No. 2004-273433 (filed on 21 Sep. 2004); and

Japanese Patent Application No. 2004-273435 (filed on 21 Sep. 2004).

The invention claimed is:

1. A projector device, comprising:
a projection image generation device that projects an image selected as a projection subject and a calibration image generated by superimposing a predetermined calibration pattern of predetermined configuration upon a part of the image selected as the projection subject upon a projection surface;
a photographic device that photographs the projected calibration image; and
a calibration control device that repeatedly executes calibration operation for adjusting appearances of the projection images on the projection surface during projection of the projection images, based upon the pattern of predetermined configuration included in the projected calibration image which is acquired by photography by the photographic device, wherein:
the projection image generation device projects the calibration image for a predetermined short time period between intervals of time during which the image selected as the projection subject is projected; and
the photographic device photographs the projected calibration image in synchronization with projection timing of the calibration image.

2. A projector device according to claim 1, wherein the calibration control device repeatedly executes the calibration operation upon a fixed cycle.

3. A projector device according to claim 1, further comprising an actuation input device that has a plurality of actuation keys for receiving actuation input from a user, wherein:
the calibration control device repeatedly executes the calibration operation each time actuation input is applied to any one of the actuation keys.

4. A projector device according to claim 1, further comprising a setting device that sets a frequency for execution of the calibration operation, wherein:
the calibration control device:
when a first execution frequency is set by the setting device, repeatedly executes the calibration operation during the projection of the projection images;
when a second execution frequency is set, executes the calibration operation only once during projection of the projection images; and
when a third execution frequency is set, does not execute the calibration operation.

5. A projector device according to claim 1, wherein:
the calibration operation includes at least one of adjustment of focus conditions of the projection images, adjustment of brightness of the projection images, adjustment of hues of the projection images, and adjustment of trapezoidal deformation of the projection images.

6. A projector device according to claim 5, wherein:
the projection image generation device projects either one of a still image and a moving image upon the projection surface; and
when the still image is projected by the projection image generation device, the calibration control device adjusts the focus conditions of the projection images based upon the pattern of predetermined configuration included in the projected calibration image which is acquired by photography by the photographic device.

7. A projector device according to claim 5, wherein:
the projection image generation device comprises a light source and projects the images by using light emitted from the light source upon the projection surface;

if the brightness of the projection images is to be darker than a predetermined reference value, the calibration control device adjusts the brightness of the projection images by decreasing the amount of light emission from the light source, and if the brightness of the projection images is to be brighter than the reference value, the calibration control device adjusts the brightness of the projection images by changing brightness of the images being projected.

8. A portable telephone, comprising a projector device according to claim 1.

9. A projector device, comprising:

a projection image generation device that projects an image selected as a projection subject and a calibration image generated by superimposing an image of a predetermined drawing or symbol upon a part of the image selected as the projection subject upon a projection surface;

a photographic device that photographs the projected calibration image; and a calibration control device that repeatedly executes calibration operation for adjusting trapezoidal deformation of the projection images on the projection surface during projection of the projection images, based upon the predetermined drawing or symbol included in the projected calibration image which is acquired by photography by the photographic device, wherein:

the projection image generation device projects the calibration image for a predetermined short time period between intervals of time during which the image selected as the projection subject is projected; and the photographic device photographs the projected calibration image in synchronization with protection timing of the calibration image.

* * * * *